US011659512B2

(12) United States Patent
Prabhakar et al.

(10) Patent No.: US 11,659,512 B2
(45) Date of Patent: May 23, 2023

(54) KNOWLEDGE OF SLICE QUOTA AVAILABILITY FOR A UE

(71) Applicant: Apple Inc., Cupertino, CA (US)

(72) Inventors: Alosious Pradeep Prabhakar, Singapore (SG); Alistair M McFarlane, Dorking (GB); Krisztian Kiss, Hayward, CA (US); Vijay Venkataraman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/204,753

(22) Filed: Mar. 17, 2021

(65) Prior Publication Data

US 2021/0297977 A1    Sep. 23, 2021

Related U.S. Application Data

(60) Provisional application No. 62/990,663, filed on Mar. 17, 2020.

(51) Int. Cl.
*H04W 60/00* (2009.01)
*H04W 48/18* (2009.01)
*H04W 48/16* (2009.01)

(52) U.S. Cl.
CPC .......... *H04W 60/00* (2013.01); *H04W 48/16* (2013.01); *H04W 48/18* (2013.01)

(58) Field of Classification Search
CPC ..... H04W 60/00; H04W 48/16; H04W 48/18; H04W 8/06
See application file for complete search history.

(56) References Cited

U.S. PATENT DOCUMENTS

| | | | | |
|---|---|---|---|---|
| 2017/0141973 A1* | 5/2017 | Vrzic | ................... | H04W 24/02 |
| 2019/0373520 A1* | 12/2019 | Sillanpää | ............. | H04W 24/02 |
| 2020/0214054 A1* | 7/2020 | Qiao | ..................... | H04W 48/18 |
| 2020/0359440 A1* | 11/2020 | Qiao | ..................... | H04W 76/12 |
| 2021/0377814 A1* | 12/2021 | Sillanpaa | ............. | H04W 76/10 |

OTHER PUBLICATIONS

3rd Generation Partnership Project; Technical Specification Group Services and System Aspects; Study on Enhancement of Network Slicing; Phase 2 (Release 17); 3GPP TR 23.700-40 Vo.3.0; Jan. 2020; 62 pages.

\* cited by examiner

*Primary Examiner* — Marcus Hammonds
(74) *Attorney, Agent, or Firm* — Kowert, Hood, Munyon, Rankin & Goetzel, P.C.

(57) ABSTRACT

Apparatuses, systems, and methods for a network to notify user equipment device (UE) whether a network slice the UE has requested is subject to a quota. An AMF of the network may inform the UE if an allowed slice(s) is subject to quota management as part of a registration procedure via a registration accept and/or a UE configuration update command. In addition to providing information regarding whether an S-NSSAI is subject to quota management, the AMF may also share the percent of quota availability to the UE. The UE may implement access control logic based on the received available quota for a particular network slice.

20 Claims, 18 Drawing Sheets

|   |   |   |   |   |   |   |   |
|---|---|---|---|---|---|---|---|
| 1 | 2 | 3 | 4 | 5 | 6 | 7 | 8 |

- Octet 1: S-NSSAI IEI
- Octet 2: Length of S-NSAI Contents
- Octet 3: SST
- Octet 4: SD
- Octet 6: Mapped HPLMN SST
- Octet 7: Mapped HPLMN SD
- Octet 8: 
- Octet 10: Quota Management
- Octet 11:

FIG. 9

KNOWLEDGE OF SLICE QUOTA AVAILABILITY FOR A UE

PRIORITY DATA

This application claims priority to U.S. provisional patent application Ser. No. 62/990,663, entitled "A Knowledge of Slice Quota Availability for a UE," filed Mar. 17, 2020, which is hereby incorporated by reference in its entirety as though fully and completely set forth herein.

FIELD

The invention relates to wireless communications, and more particularly to apparatuses, systems, and methods for a network to notify user equipment device (UE) whether a network slice the UE has requested is subject to a quota.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) has become the technology of choice for the majority of wireless network operators worldwide, providing mobile broadband data and high-speed Internet access to their subscriber base. LTE defines a number of downlink (DL) physical channels, categorized as transport or control channels, to carry information blocks received from medium access control (MAC) and higher layers. LTE also defines a number of physical layer channels for the uplink (UL).

For example, LTE defines a Physical Downlink Shared Channel (PDSCH) as a DL transport channel. The PDSCH is the main data-bearing channel allocated to users on a dynamic and opportunistic basis. The PDSCH carries data in Transport Blocks (TB) corresponding to a MAC protocol data unit (PDU), passed from the MAC layer to the physical (PHY) layer once per Transmission Time Interval (TTI). The PDSCH is also used to transmit broadcast information such as System Information Blocks (SIB) and paging messages.

As another example, LTE defines a Physical Downlink Control Channel (PDCCH) as a DL control channel that carries the resource assignment for UEs that are contained in a Downlink Control Information (DCI) message. Multiple PDCCHs can be transmitted in the same subframe using Control Channel Elements (CCE), each of which is a nine set of four resource elements known as Resource Element Groups (REG). The PDCCH employs quadrature phase-shift keying (QPSK) modulation, with four QPSK symbols mapped to each REG. Furthermore, 1, 2, 4, or 8 CCEs can be used for a UE, depending on channel conditions, to ensure sufficient robustness.

Additionally, LTE defines a Physical Uplink Shared Channel (PUSCH) as a UL channel shared by all devices (user equipment, UE) in a radio cell to transmit user data to the network. The scheduling for all UEs is under control of the LTE base station (enhanced Node B, or eNB). The eNB uses the uplink scheduling grant (DCI format 0) to inform the UE about resource block (RB) assignment, and the modulation and coding scheme to be used. PUSCH typically supports QPSK and quadrature amplitude modulation (QAM). In addition to user data, the PUSCH also carries any control information necessary to decode the information, such as transport format indicators and multiple-in multiple-out (MIMO) parameters. Control data is multiplexed with information data prior to digital Fourier transform (DFT) spreading.

A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR proposes a higher capacity for a higher density of mobile broadband users, also supporting device-to-device, ultra-reliable, and massive machine communications, as well as lower latency and lower battery consumption, than current LTE standards. Further, the 5G-NR standard may allow for less restrictive UE scheduling as compared to current LTE standards. Consequently, efforts are being made in ongoing developments of 5G-NR to take advantage of higher throughputs possible at higher frequencies.

SUMMARY

Embodiments relate to wireless communications, and more particularly to apparatuses, systems, and methods for a network to notify user equipment device (UE) whether a network slice the UE has requested is subject to a quota.

In some embodiments, an AMF/SMF of the network may inform the UE if an allowed slice(s) is subject to quota management as part of a registration procedure via a registration accept and/or a UE configuration update command. In some embodiments, in addition to providing information regarding whether an S-NSSAI is subject to quota management, the AMF/SMF may also share the percent of quota availability to the UE. In some embodiments, the UE may implement access control logic based on the received available quota for a particular network slice. For example, in some embodiments, an access and mobility management function (AMF) of a network may receive, from a UE, a registration request message that may include at least an indication of a requested single network slice selection assistance information (S-NSSAI) and may send, to a network slice quota management (NSQM) function (note that as used herein, the NSQM function may also be referred to as a network slice access control function (NSCAF)) monitoring the requested S-NSSAI, a registration count request message that may include at least the indication of the S-NSSAI. The AMF may receive, from the NSQM function, a registration count response message that includes at least an indication that the S-NSSAI is subject to quota management and may send, to the UE, a registration accept message that includes at least the indication that the S-NSSAI is subject to quota management. In some embodiments, the registration count response message and/or the registration accept message may further include an indication of a percentage of available quota for the requested S-NSSAI. In some embodiments, the indication that the S-NSSAI is subject to quota management may be included in a field of an S-NSSAI information element. In some embodiments, the indication of the percentage of available quota for the requested S-NSSAI may be included in a field of an S-NSSAI information element. As another example, in some embodiments, an AMF of a network may receive, from a UE, a PDU session request message that may include at least an indication of a requested single network slice selection assistance information (S-NSSAI) and may send, to an NSQM function, a PDU count request message that may include at least the indication of the S-NSSAI. The AMF may receive, from the NSQM function, a PDU count response message that may include at least an indication that the S-NSSAI is subject to quota management and may establish, with a session management function (SMF) of the network, a PDU session. The AMF may send, to the UE, a PDU session establishment accept message that may include at least the indication that the S-NSSAI is subject to quota management. In some embodiments, the PDU count response message and/or the PDU session establishment accept message may further include an indication of a percentage of available quota for the requested S-NSSAI. In some embodiments, the indication that the S-NSSAI is subject to quota management may be included in a field of an S-NSSAI information element. In some embodiments, the indication of the percentage of available quota for the requested S-NSSAI may be included in a field of an S-NSSAI information element.

The techniques described herein may be implemented in and/or used with a number of different types of devices, including but not limited to unmanned aerial vehicles (UAVs), unmanned aerial controllers (UACs), base stations, access points, cellular phones, tablet computers, wearable computing devices, portable media players, automobiles and/or motorized vehicles, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 9 illustrates an example of an S-NSSAI information element, according to some embodiments.

Figure 1A:
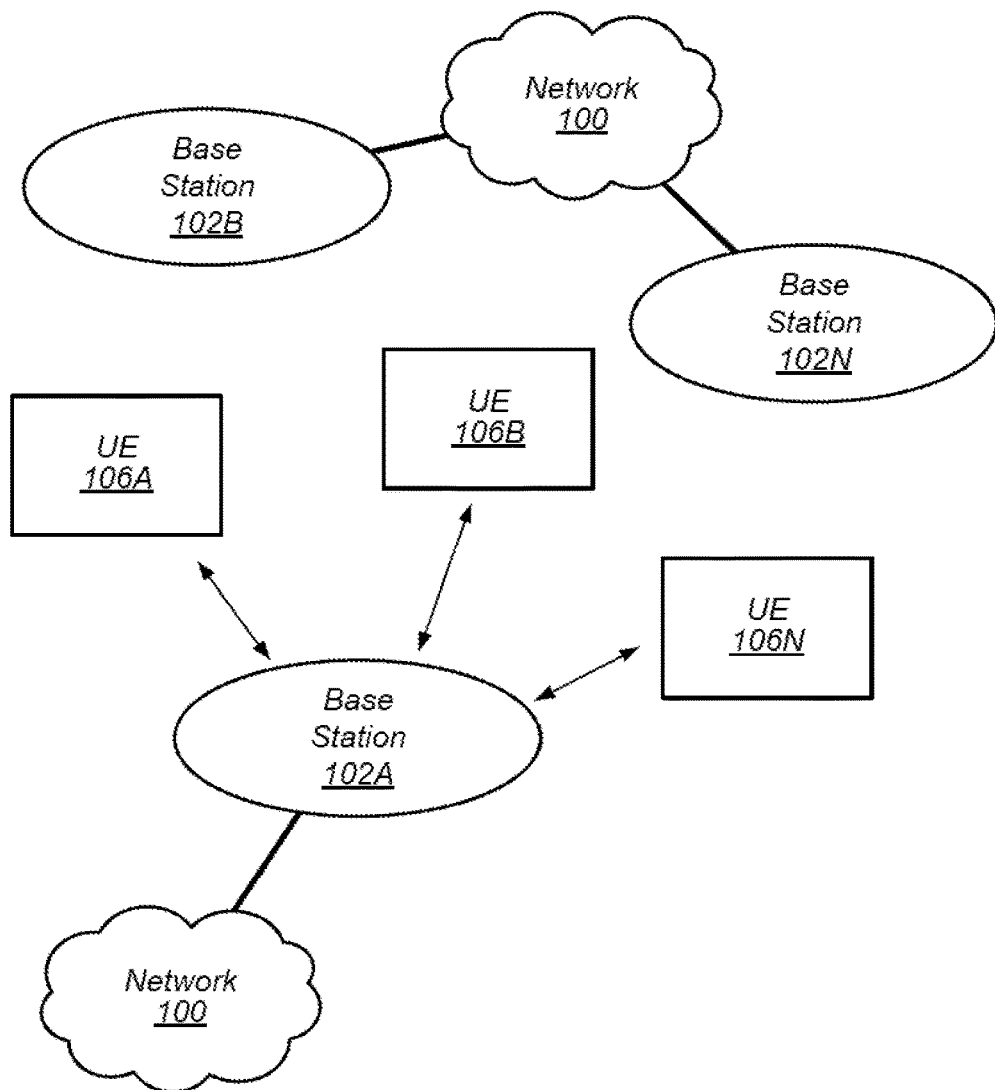
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
TS: Technical Specification
RAN: Radio Access Network
RAT: Radio Access Technology
UE: User Equipment
RF: Radio Frequency
BS: Base Station
DL: Downlink
UL: Uplink
LTE: Long Term Evolution NR: New Radio
5GS: 5G System
5GMM: 5GS Mobility Management
5GC: 5G Core Network
IE: Information Element
NG-RAN: Next Generation Radio Access Network
S-NSSAI: Single Network Slice Selection Assistance Information
NSAAA: Network Slice Authentication and authorization procedure
NSSF: Network Slice Selection Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), laptops, wearable devices (e.g. smart watch, smart glasses), PDAs, portable Internet devices, music players, data storage devices, other handheld devices, automobiles and/or motor vehicles, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by (or with) a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
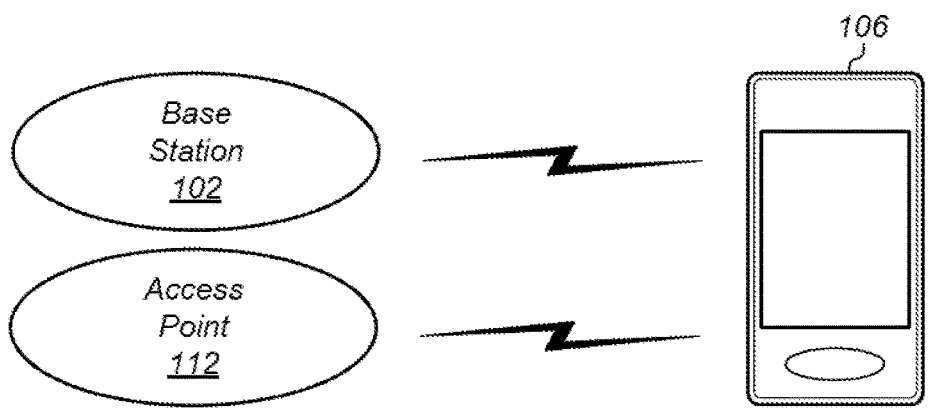
FIG. 1B illustrates an example of a base station (BS) and an access point in communication with a user equipment (UE) device according to some embodiments.

FIGS. 1A and 1B—Communication Systems

FIG. 1A illustrates a simplified example wireless communication system, according to some embodiments. It is noted that the system of FIG. 1A is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
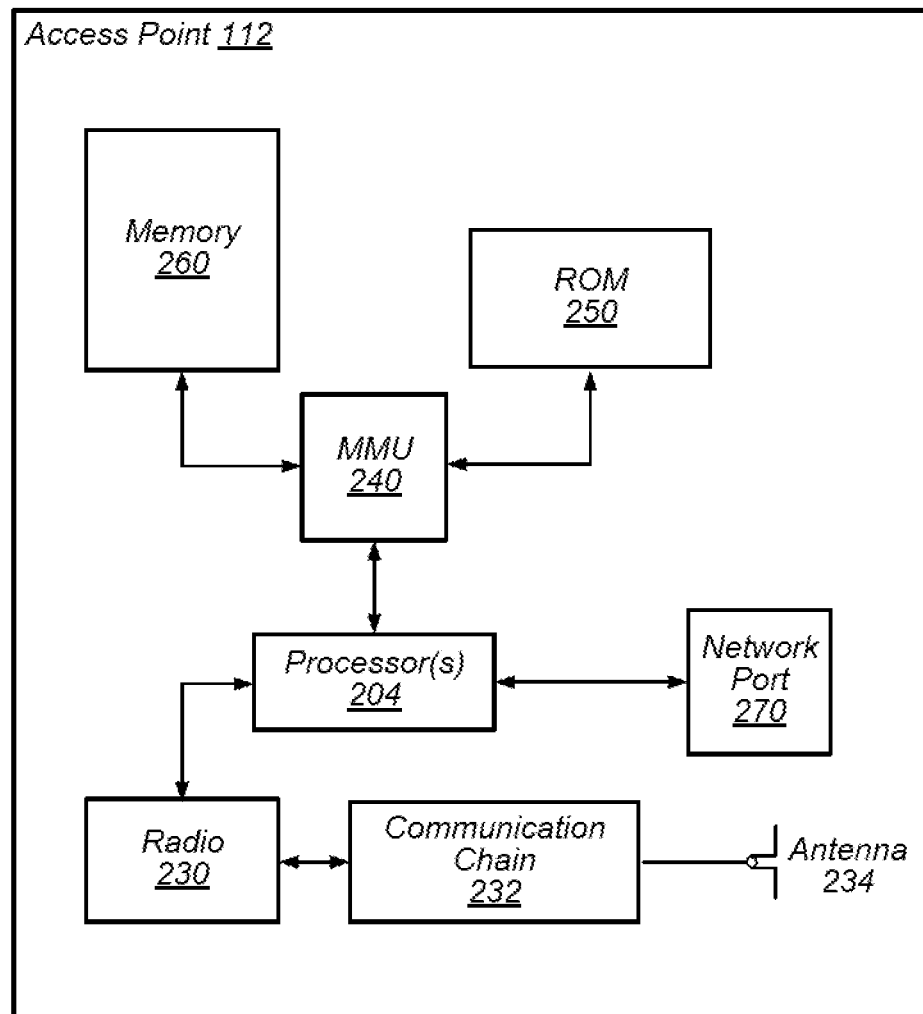
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as UEs 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with UE 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, 5G NR, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, an AP 112 may be configured to perform methods for a network to notify user equipment device (UE) whether a network slice the UE has requested is subject to a quota as further described herein.

Figure 3:
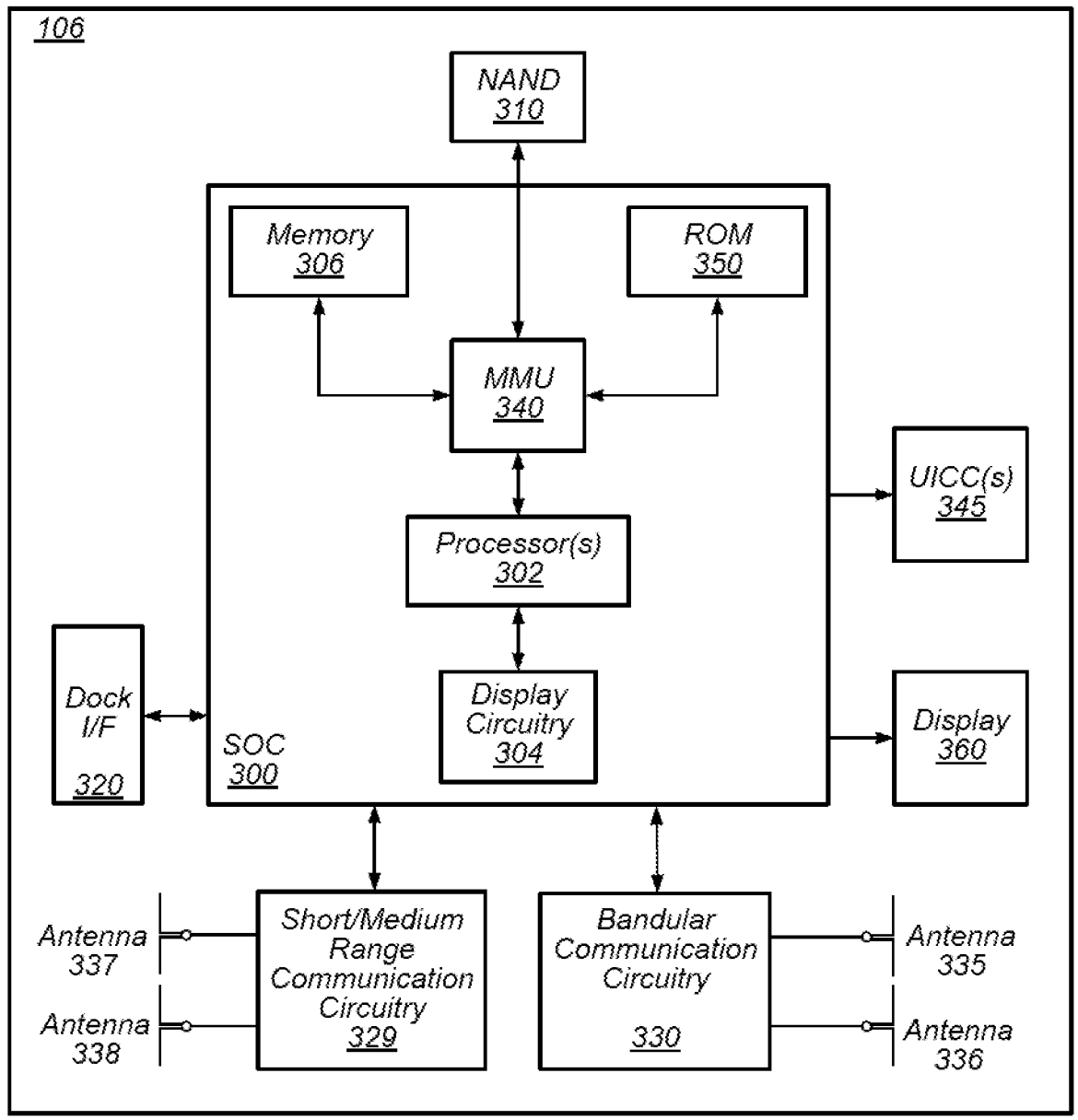
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, an unmanned aerial vehicle (UAV), a UAV controller (UAC) and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345. Note that the term "SIM" or "SIM entity" is intended to include any of various types of SIM implementations or SIM functionality, such as the one or more UICC(s) cards 345, one or more eUICCs, one or more eSIMs, either removable or embedded, etc. In some embodiments, the UE 106 may include at least two SIMs. Each SIM may execute one or more SIM applications and/or otherwise implement SIM functionality. Thus, each SIM may be a single smart card that may be embedded, e.g., may be soldered onto a circuit board in the UE 106, or each SIM 310 may be implemented as a removable smart card. Thus the SIM(s) may be one or more removable smart cards (such as UICC cards, which are sometimes referred to as "SIM cards"), and/or the SIMS 310 may be one or more embedded cards (such as embedded UICCs (eUICCs), which are sometimes referred to as "eSIMs" or "eSIM cards"). In some embodiments (such as when the SIM(s) include an eUICC), one or more of the SIM(s) may implement embedded SIM (eSIM) functionality; in such an embodiment, a single one of the SIM(s) may execute multiple SIM applications. Each of the SIMs may include components such as a processor and/or a memory; instructions for performing SIM/eSIM functionality may be stored in the memory and executed by the processor. In some embodiments, the UE 106 may include a combination of removable smart cards and fixed/non-removable smart cards (such as one or more eUICC cards that implement eSIM functionality), as desired. For example, the UE 106 may comprise two embedded SIMs, two removable SIMs, or a combination of one embedded SIMs and one removable SIMS. Various other SIM configurations are also contemplated.

As noted above, in some embodiments, the UE 106 may include two or more SIMs. The inclusion of two or more SIMs in the UE 106 may allow the UE 106 to support two different telephone numbers and may allow the UE 106 to communicate on corresponding two or more respective networks. For example, a first SIM may support a first RAT such as LTE, and a second SIM 310 support a second RAT such as 5G NR. Other implementations and RATs are of course possible. In some embodiments, when the UE 106 comprises two SIMs, the UE 106 may support Dual SIM Dual Active (DSDA) functionality. The DSDA functionality may allow the UE 106 to be simultaneously connected to two networks (and use two different RATs) at the same time, or to simultaneously maintain two connections supported by two different SIMs using the same or different RATs on the same or different networks. The DSDA functionality may also allow the UE 106 to simultaneously receive voice calls or data traffic on either phone number. In certain embodiments the voice call may be a packet switched communication. In other words, the voice call may be received using voice over LTE (VoLTE) technology and/or voice over NR (VoNR) technology. In some embodiments, the UE 106 may support Dual SIM Dual Standby (DSDS) functionality. The DSDS functionality may allow either of the two SIMS in the UE 106 to be on standby waiting for a voice call and/or data connection. In DSDS, when a call/data is established on one SIM, the other SIM is no longer active. In some embodiments, DSDx functionality (either DSDA or DSDS functionality) may be implemented with a single SIM (e.g., a eUICC) that executes multiple SIM applications for different carriers and/or RATs.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short to medium range wireless communication circuitry 329, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform methods for a network to notify user equipment device (UE) whether a network slice the UE has requested is subject to a quota as further described herein.

As described herein, the communication device 106 may include hardware and software components for implementing the above features for a communication device 106 to communicate a scheduling profile for power savings to a network. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short to medium range wireless communication circuitry 329 may each include one or more processing elements. In other words, one or more processing elements may be included in cellular communication circuitry 330 and, similarly, one or more processing elements may be included in short to medium range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short to medium range wireless communication circuitry 329 may include one or more ICs that are configured to perform the functions of short to medium range wireless communication circuitry 329. In addition, each integrated circuit may include circuitry (e.g., first circuitry, second circuitry, etc.) configured to perform the functions of short to medium range wireless communication circuitry 329.

Figure 4:
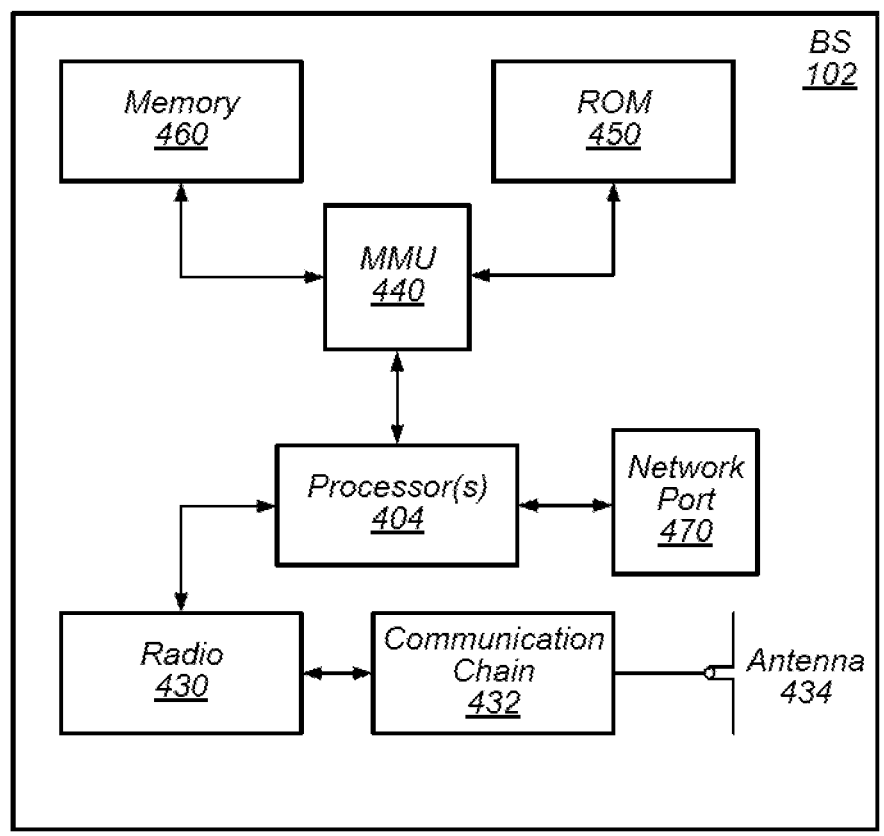
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB s.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
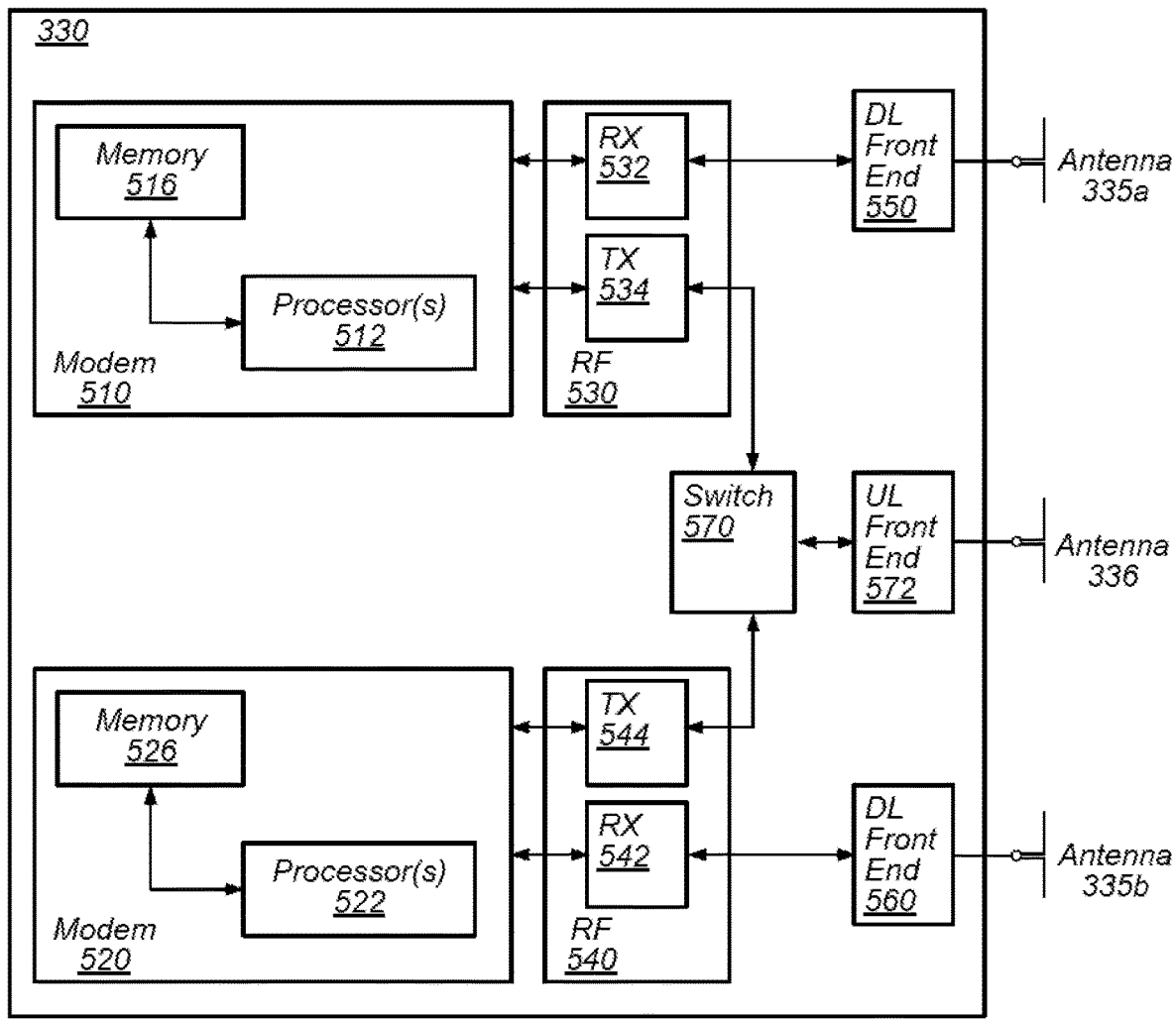
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to perform methods a network to notify user equipment device (UE) whether a network slice the UE has requested is subject to a quota as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

5G NR Architecture with LTE

Figure 6A:
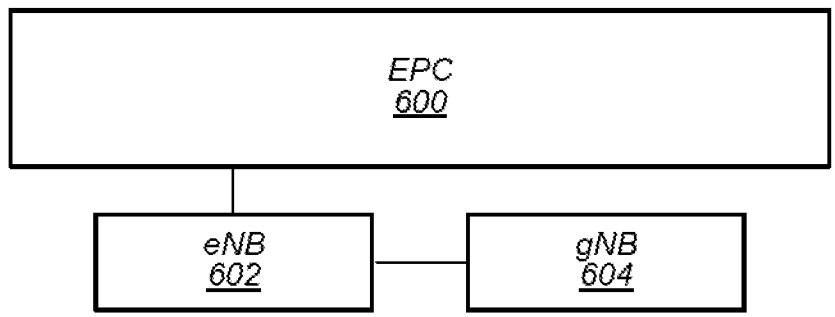
FIG. 6A illustrates an example of connections between an EPC network, an LTE base station (eNB), and a 5G NR base station (gNB).
Figure 6B:
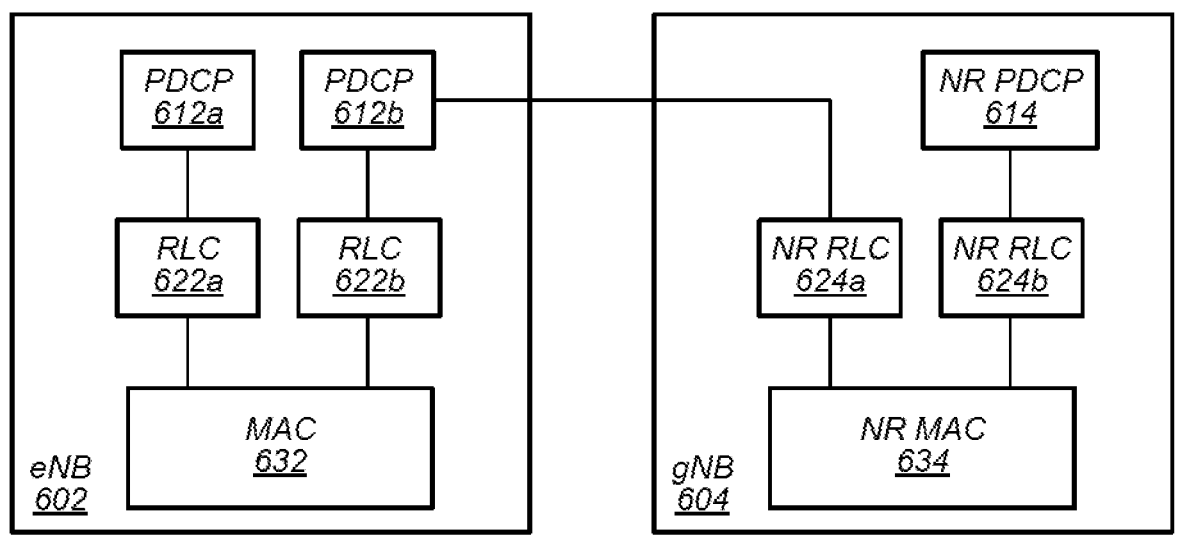
FIG. 6B illustrates an example of a protocol stack for an eNB and a gNB.

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a may interface via a master cell group (MCG) bearer with EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 612b of eNB 602 via an X2 interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

5G Core Network Architecture—Interworking with Wi-Fi

Figure 7A:
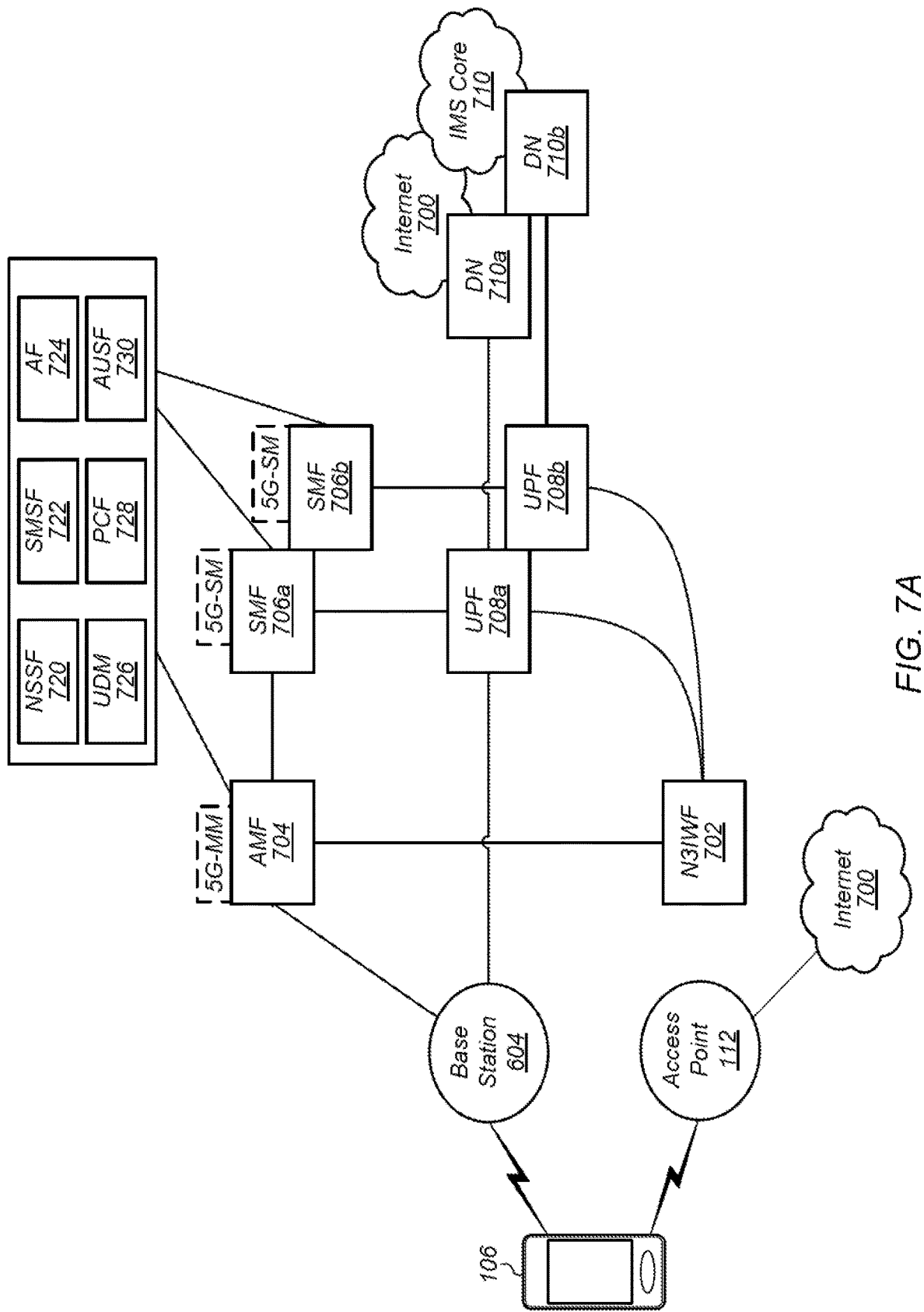
FIG. 7A illustrates an example of a 5G network architecture that incorporates both 3GPP (e.g., cellular) and non-3GPP (e.g., non-cellular) access to the 5G CN, according to some embodiments.

In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 7A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB or base station 604) and an access point, such as AP 112. The AP 112 may include a connection to the Internet 700 as well as a connection to a non-3GPP inter-working function (N3IWF) 702 network entity. The N3IWF may include a connection to a core access and mobility management function (AMF) 704 of the 5G CN. The AMF 704 may include an instance of a 5G mobility management (5G MM) function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. As shown, the AMF 704 may include one or more functional entities associated with the 5G CN (e.g., network slice selection function (NSSF) 720, short message service function (SMSF) 722, application function (AF) 724, unified data management (UDM) 726, policy control function (PCF) 728, and/or authentication server function (AUSF) 730). Note that these functional entities may also be supported by a session management function (SMF) 706a and an SMF 706b of the 5G CN. The AMF 706 may be connected to (or in communication with) the SMF 706a. Further, the gNB 604 may in communication with (or connected to) a user plane function (UPF) 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

Figure 7B:
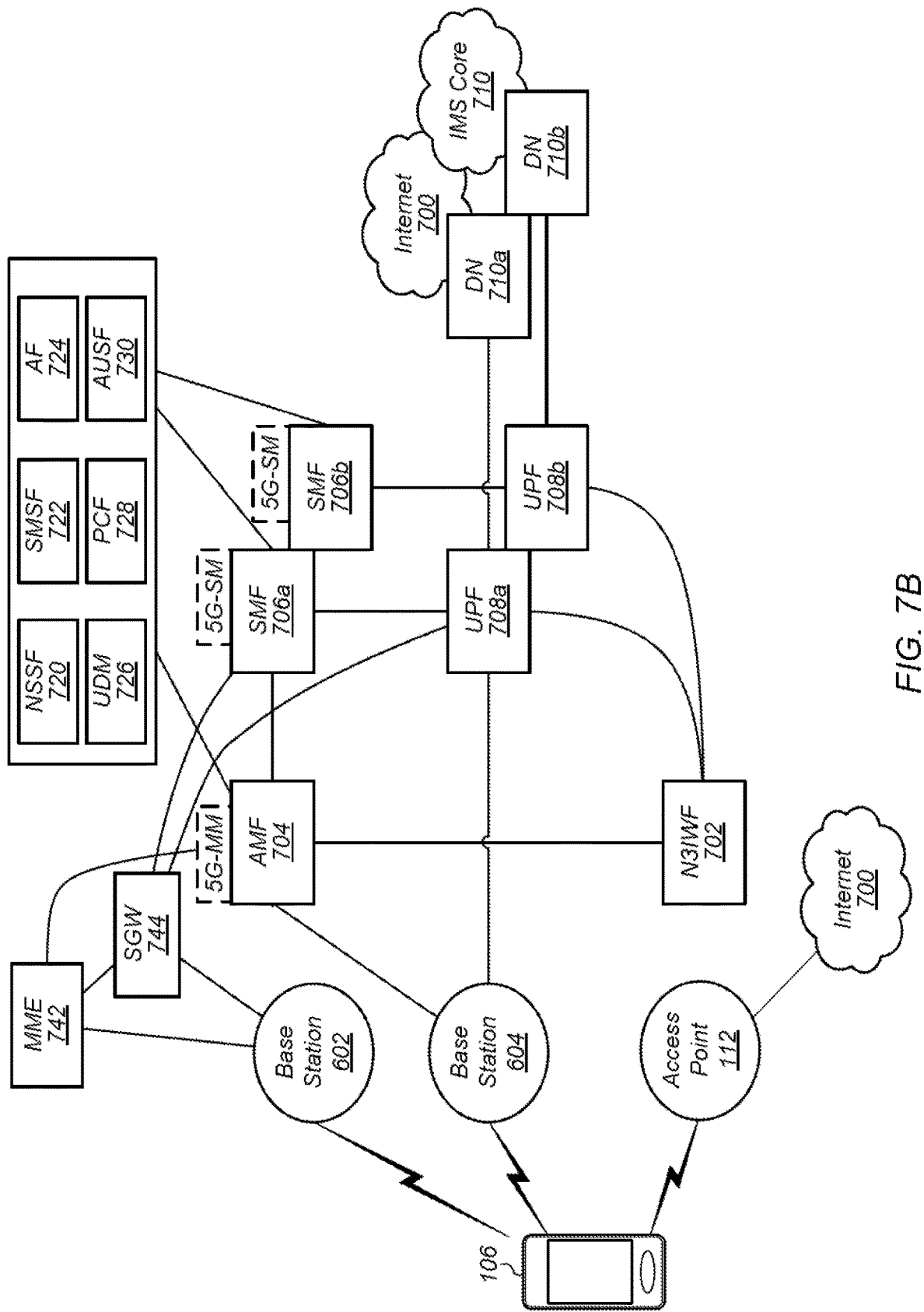
FIG. 7B illustrates an example of a 5G network architecture that incorporates both dual 3GPP (e.g., LTE and 5G NR) access and non-3GPP access to the 5G CN, according to some embodiments.

FIG. 7B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB or base station 604 or eNB or base station 602) and an access point, such as AP 112. The AP 112 may include a connection to the Internet 700 as well as a connection to the N3IWF 702 network entity. The N3IWF may include a connection to the AMF 704 of the 5G CN. The AMF 704 may include an instance of the 5G MM function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. In addition, the 5G CN may support dual-registration of the UE on both a legacy network (e.g., LTE via base station 602) and a 5G network (e.g., via base station 604). As shown, the base station 602 may have connections to a mobility management entity (MME) 742 and a serving gateway (SGW) 744. The MME 742 may have connections to both the SGW 744 and the AMF 704. In addition, the SGW 744 may have connections to both the SMF 706a and the UPF 708a. As shown, the AMF 704 may include one or more functional entities associated with the 5G CN (e.g., NSSF 720, SMSF 722, AF 724, UDM 726, PCF 728, and/or AUSF 730). Note that UDM 726 may also include a home subscriber server (HSS) function and the PCF may also include a policy and charging rules function (PCRF). Note further that these functional entities may also be supported by the SMF 706a and the SMF 706b of the 5G CN. The AMF 706 may be connected to (or in communication with) the SMF 706a. Further, the gNB 604 may in communication with (or connected to) the UPF 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

Note that in various embodiments, one or more of the above described network entities may be configured to perform methods to improve security checks in a 5G NR network, including mechanisms a network to notify user equipment device (UE) whether a network slice the UE has requested is subject to a quota, e.g., as further described herein.

Figure 8:
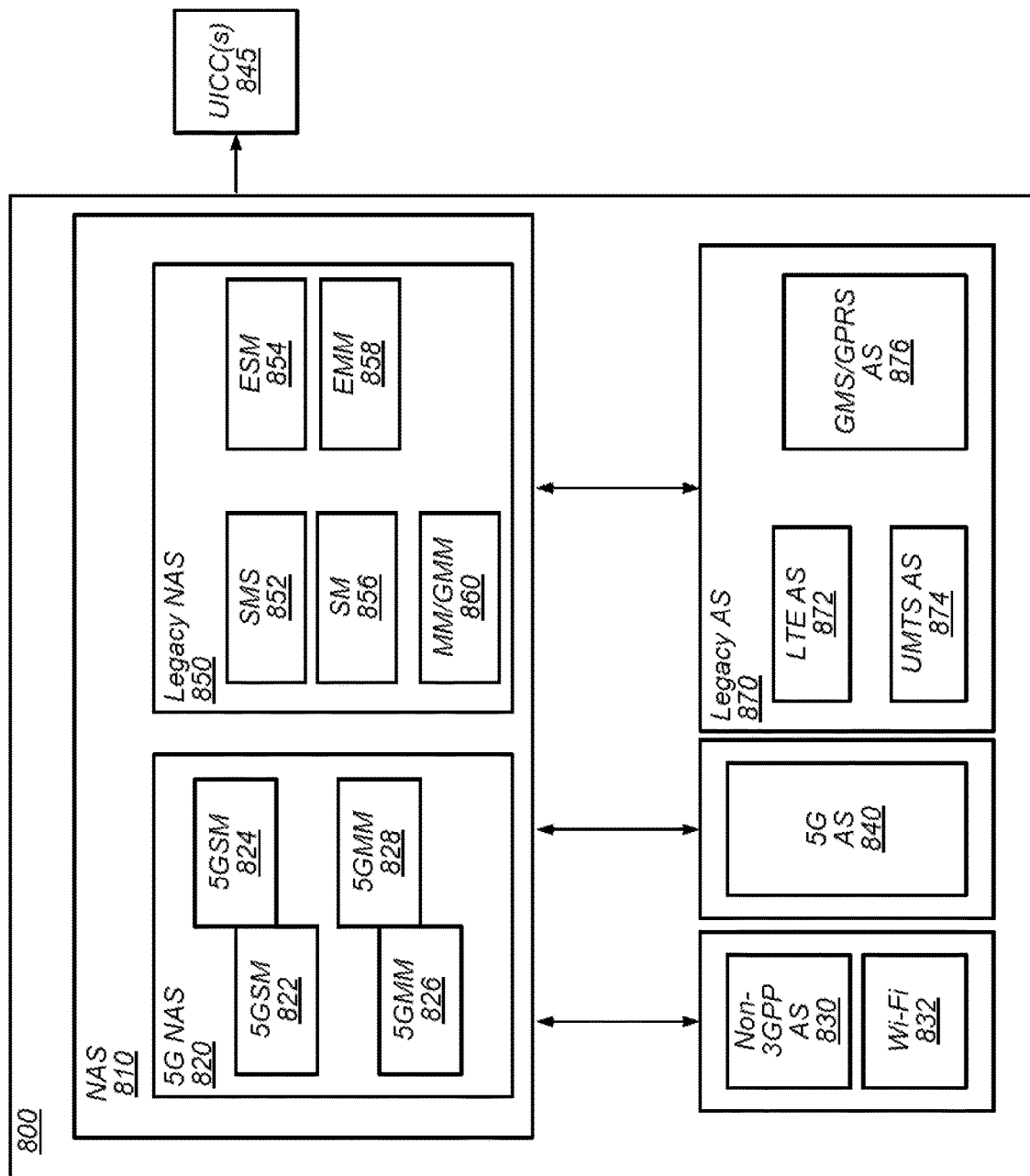
FIG. 8 illustrates an example of a baseband processor architecture for a UE, according to some embodiments.

FIG. 8 illustrates an example of a baseband processor architecture for a UE (e.g., such as UE 106), according to some embodiments. The baseband processor architecture 800 described in FIG. 8 may be implemented on one or more radios (e.g., radios 329 and/or 330 described above) or modems (e.g., modems 510 and/or 520) as described above. As shown, the non-access stratum (NAS) 810 may include a 5G NAS 820 and a legacy NAS 850. The legacy NAS 850 may include a communication connection with a legacy access stratum (AS) 870. The 5G NAS 820 may include communication connections with both a 5G AS 840 and a non-3GPP AS 830 and Wi-Fi AS 832. The 5G NAS 820 may include functional entities associated with both access stratums. Thus, the 5G NAS 820 may include multiple 5G MM entities 826 and 828 and 5G session management (SM) entities 822 and 824. The legacy NAS 850 may include functional entities such as short message service (SMS) entity 852, evolved packet system (EPS) session management (ESM) entity 854, session management (SM) entity 856, EPS mobility management (EMM) entity 858, and mobility management (MM)/GPRS mobility management (GMM) entity 860. In addition, the legacy AS 870 may include functional entities such as LTE AS 872, UMTS AS 874, and/or GSM/GPRS AS 876.

Thus, the baseband processor architecture 800 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, and so forth) for both accesses.

Note that in various embodiments, one or more of the above described functional entities of the 5G NAS and/or 5G AS may be configured to perform methods a network to notify user equipment device (UE) whether a network slice the UE has requested is subject to a quota, e.g., as further described herein.

UE Knowledge of Slice Quota

In some implementations, a network slice quota management (NSQM) function (i.e., a network slice access control function (NSCAF)) may maintain a quota of a number of users registered to a network slice (e.g., a single network slice selection assistance information (S-NSSAI) as well as a number of protocol data unit (PDU) sessions active for an S-NSSAI. Additionally, during a UE registration procedure, in cases where quota is unavailable, the network may reject the slice registration and add a cause of "Rejected S-NSSAI" as part of a registration response. Further, during UE PDU session establishment, the network may reject the UE PDU session establishment request in cases where the requested PDU session causes the number of PDU sessions active for the requested S-NSSAI to exceed a threshold number of PDU sessions for the requested S-NSSAI.

Thus, at registration, a UE may have knowledge as to whether a slice is subject to quota if the slice is part of "Rejected S-NSSAI" and its related cause code for rejection. Similarly, at PDU session establishment reject, a UE may have knowledge as to whether a slice is subject to a quota based on a 5GSM reject cause code (e.g., insufficient resources for specific slice, maximum number of PDU sessions reached, and so forth). However, for slices which are part of "Allowed S-NSSAI" and/or get a successful "PDU Session Establishment Accept", the UE may not know may have knowledge as to whether a slice (e.g., either requested/subscribed/allowed) is subject to a quota.

Embodiments described herein provide apparatuses, systems, mechanisms and methods for a network to notify user equipment device (UE) as to whether a network slice the UE has requested is subject to a quota. In some embodiments, the network may additionally provide the UE with a percentage of quota available for the requested network slice. In some embodiments, the UE may base, at least in part, a decision to initiate a PDU session within an S-NSSAI on the percentage of quota available. In some embodiments, an S-NSSAI information element may include an 8-bit quota management value, where a first bit indicates whether a requested slice is subject to quota management and where remaining bits indicate a percentage of available quota for the requested slice.

In some embodiments, a core access and mobility management function (AMF), such as AMF 704, and/or a session management function (SMF), such as SMF 706a/b, may inform a user equipment device (UE), such as UE 106, if/when an allowed slice(s) is subject to quota management as part of a registration procedure via a registration accept message and/or a UE configuration update command message. Further, when a UE receives a registration access and/or a UE configuration update command, 3 information elements (IEs) may be present, including an Allowed S-NSSAI IE, a Rejected S-NSSAI IE, and/or a Pending S-NSSAI IE. In some embodiments, an Allowed S-NSSAI IE and/or a Pending S-NSSAI IE may contain (include and/or comprise) a flag (e.g., indication and/or bit) which may specify to the UE if a particular S-NSSAI is subject to quota management. In some embodiments, a flag value of "0" may indicate not subject to quota management and a value of "1" may indicate subject to quota management.

In some embodiments, a core access and mobility management function (AMF), such as AMF 704, and/or a session management function (SMF), such as SMF 706a/b, may inform a user equipment device (UE), such as UE 106, a percentage of quota available to the UE for a particular S-NSSAI. In some embodiments, an Allowed S-NSSAI IE and/or a Pending S-NSSAI IE may contain (include and/or comprise) bits indicating/specifying the percentage of quota available to the UE for the particular S-NSSAI. In some embodiments, an 8-bit indicator may be implemented to specify to the UE that a particular S-NSSAI is subject to quota management and the percentage of quota available. For example, 1 bit may indicate whether the particular S-NSSAI is subject to quota management and the remaining 7 bits may indicate the percentage of available quota for the particular S-NSSAI.

For example, FIG. 9 illustrates an example of an S-NSSAI information element, according to some embodiments. As shown, the S-NSSAI may include an S-NSSAI information element identifier (IEI) field, a length of S-NSSAI contents field, a slice/service type (SST) field, a slice differentiator (SD) field, a mapped home public land mobile network (HPLMN) SST field, a mapped HPLMN SD field, and a quota management field. In some embodiments, the quota management field may be 8 bits. In some embodiments, the first bit (e.g., bit 1) may indicate whether the particular S-NSSAI is subject to quota management and the remaining 7 bits (e.g., bits 2 to 8) may indicate the percentage of available quota for the particular S-NSSAI.

Figure 10:
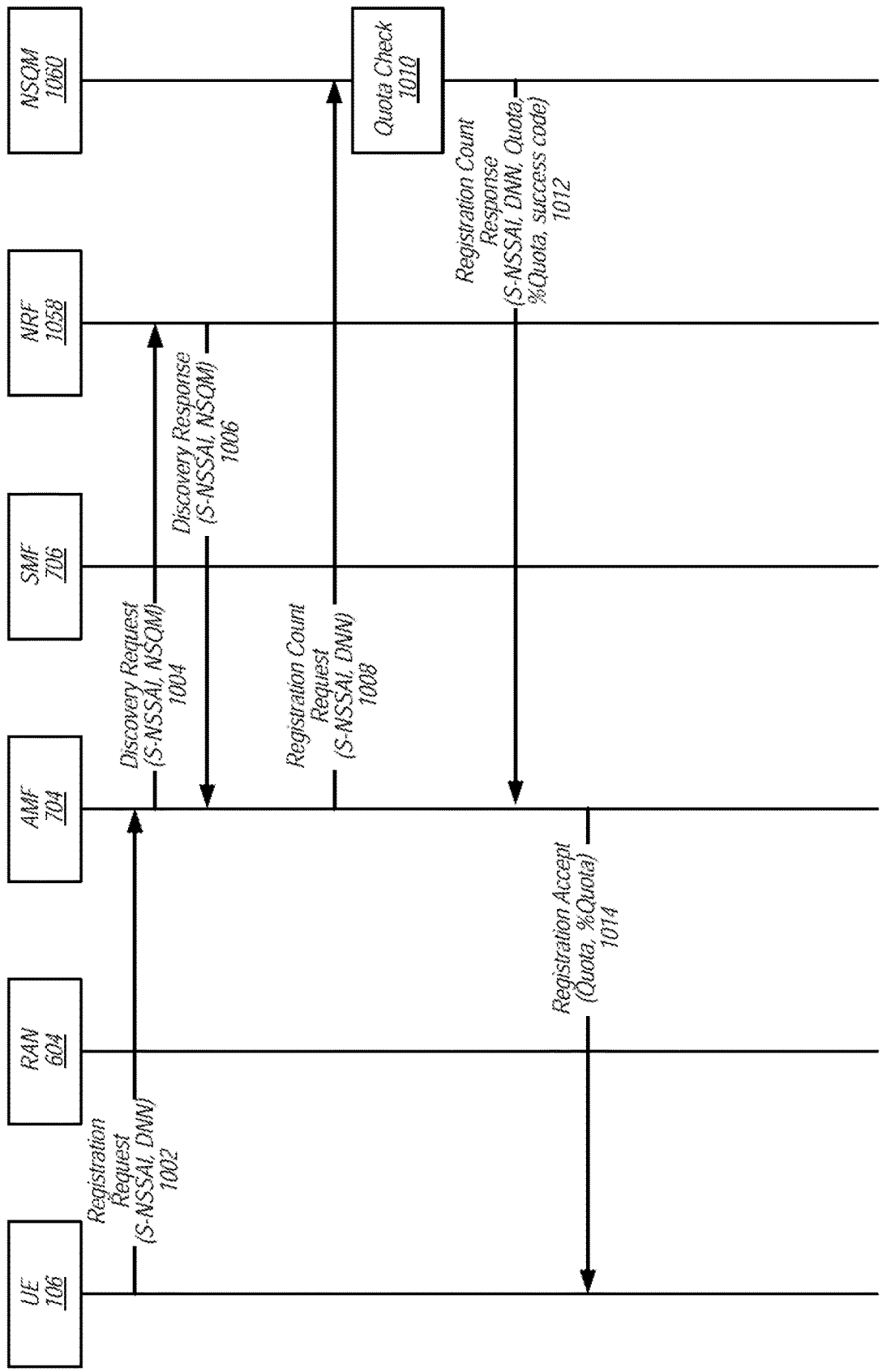
FIG. 10 illustrates a block diagram of an example of a call flow for a network slice registration procedure, according to some embodiments.

FIG. 10 illustrates a block diagram of an example of a call flow for a network slice registration procedure, according to some embodiments. The call flow shown in FIG. 10 may be used in conjunction with any of the systems, methods, or devices shown in the Figures, among other devices. In various embodiments, some of the call flow elements shown may be performed concurrently, in a different order than shown, or may be omitted. Additional call flow elements may also be performed as desired. As shown, this call flow may operate as follows.

A UE, such as UE 106, may send a registration request message 1002 to an AMF, such as AMF 704, via a radio access network, e.g., via a base station, such as gNB 604 and/or base station 102. The registration request may include an indication of a requested S-NSSAI and a data network name (DNN). The AMF may then send a discovery request message 1004 to a network repository function (NRF), such as NRF 1058. In some embodiments, the discovery message 1004 may be (or include) a Nnrf_NFDiscovery_Request message. In some embodiments, the discovery request message 1004 may include an indication of the requested S-NSSAI and an indication of a network function (NF) type. In some embodiments, the NF type may indicate a network slice quota management (NSQM) function (i.e., a network slice access control function (NSCAF)).

Note that the NRF may maintain an updated repository of all 5G elements available in an operator's network along with services provided by each of the elements in the 5G core that are expected to be instantiated, scaled, and/or terminated without and/or with minimal manual intervention. In addition to serving as a repository of services, the NRF may also support discovery mechanisms that allows 5G elements to discover each other and receive updated status of desired elements. In some embodiments, the NRF may maintain profiles of available NF instances and supported services in the 5G core network, allow consumer NF instances to discover other providers' NF instances in the 5G core network, and/or allows NF instances to track status of other NF instances.

The NRF may send a discovery response message 1006 to the AMF. In some embodiments, the discovery response message may be (or include) a Nnrf_NFDiscovery_Response message. In some embodiments, the discovery response message may include an address to an NSQM function, such as NSQM 1060, which may also be referred to as an NSCAF. In some embodiments, the discovery response message may also include an indication of the S-NSSAI.

The AMF may then send a registration count request message 1008 to the NSQM function identified in the discovery response message 1006. The registration count request message may include an indication of the requested S-NSSAI and the DNN. In some embodiments, the registration count request message 1008 may be (or include) a Nnsqm_RegistrationCount_UECheck_Request message.

At 1010, the NSQM function may determine (e.g., check) whether there is quota available for registration of the UE in the indicated S-NSSAI. Additionally, the NSQM function may determine a percentage of quota available (and/or remaining) for the indicated S-NSSAI. The NSQM function may then send a registration count response message 1012 to the AMF. The registration count response message 1012 may include an indication of the requested S-NSSAI, the DNN, and a success code indication. In some embodiments, the registration count response message 1012 may also include an indication that the requested S-NSSAI is subject to quota management (and/or not subject to quota management). In some embodiments, the registration count response message 1012 may also include an indication of a percentage of available quota for the requested S-NSSAI. In some embodiments, the registration count message 1012 may be (or included) a Nnsqm_RegistrationCount_UECheck_Response message.

The AMF may then send a registration accept message 1014 to the UE. The registration accept message 1014 may include an indication of allowance to register/subscribe to the requested S-NSSAI. In some embodiments, the registration accept message 1014 may include an indication that the requested S-NSSAI is subject to quota management (and/or not subject to quota management). In some embodiments, the registration accept message 1014 may also include an indication of a percentage of available quota for the requested S-NSSAI. In some embodiments, the indications may be included in an S-NSSAI information element. In some embodiments, the indications may be included in a quota management field of an S-NSSAI information element. In some embodiments, the quota management field may be 8 bits. In some embodiments, the first bit (e.g., bit 1) may indicate whether the particular S-NSSAI is subject to quota management and the remaining 7 bits (e.g., bits 2 to 8) may indicate the percentage of available quota for the particular S-NSSAI.

Figure 11:
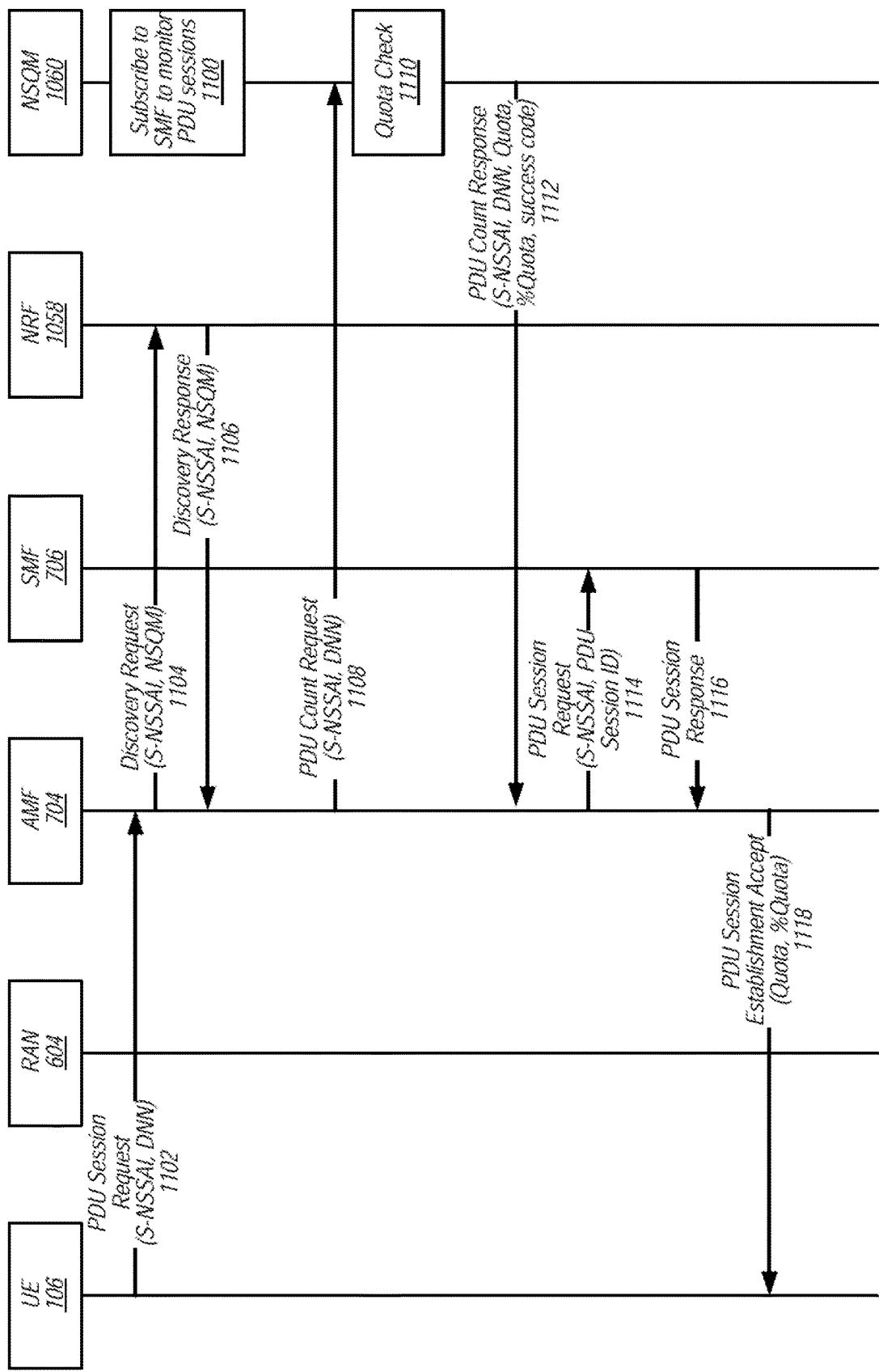
FIG. 11 illustrates a block diagram of an example of a call flow for a protocol data unit (PDU) session registration procedure, according to some embodiments.

FIG. 11 illustrates a block diagram of an example of a call flow for a protocol data unit (PDU) session registration procedure, according to some embodiments. The call flow shown in FIG. 11 may be used in conjunction with any of the systems, methods, or devices shown in the Figures, among other devices. In various embodiments, some of the call flow elements shown may be performed concurrently, in a different order than shown, or may be omitted. Additional call flow elements may also be performed as desired. As shown, this call flow may operate as follows.

At 1100, an NSQM function, such as NSQM 1060, which may also be referred to as an NSCAF, may register/subscribe to an SMF, such as SMF 706 to monitor PDU sessions associated with S-NSSAI managed by the NSQM function. Additionally, a UE, such as UE 106, may send a PDU session request message 1102 to an AMF, such as AMF 704, via a radio access network, e.g., via a base station, such as gNB 604 and/or base station 102. The PDU session request may include an indication of an S-NSSAI and a data network name (DNN). The AMF may then send a discovery request message 1104 to a network repository function (NRF), such as NRF 1058. In some embodiments, the discovery message 1104 may be (or include) a Nnrf_NFDiscovery_Request message. In some embodiments, the discovery request message 1104 may include an indication of the S-NSSAI and an indication of a network function (NF) type. In some embodiments, the NF type may indicate a network slice quota management (NSQM) function (i.e., a network slice access control function (NSCAF)).

Note that the NRF may maintain an updated repository of all 5G elements available in an operator's network along with services provided by each of the elements in the 5G core that are expected to be instantiated, scaled, and/or terminated without and/or with minimal manual intervention. In addition to serving as a repository of services, the NRF may also support discovery mechanisms that allows 5G elements to discover each other and receive updated status of desired elements. In some embodiments, the NRF may maintain profiles of available NF instances and supported services in the 5G core network, allow consumer NF instances to discover other providers' NF instances in the 5G core network, and/or allows NF instances to track status of other NF instances.

The NRF may send a discovery response message 1106 to the AMF. In some embodiments, the discovery response message may be (or include) a Nnrf_NFDiscovery_Response message. In some embodiments, the discovery response message may include an address to an NSQM function, such as NSQM 1060. In some embodiments, the discovery response message may also include an indication of the S-NSSAI.

The AMF may then send a PDU count request message 1108 to the NSQM function identified in the discovery response message 1106. The PDU count request message may include an indication of the S-NSSAI and the DNN. In some embodiments, the PDU count request message 1108 may be (or include) a Nnsqm_PDUcount_Availability-Check_Request message.

At 1110, the NSQM function may determine (e.g., check) whether there is quota available for the PDU session requested by the UE in the indicated S-NSSAI. Additionally, the NSQM function may determine a percentage of quota available (and/or remaining) for the indicated S-NSSAI. The NSQM function may then send a PDU count response message 1112 to the AMF. The PDU count response message 1112 may include an indication of the requested S-NSSAI, the DNN, and a success code indication. In some embodiments, the PDU count response message 1112 may also include an indication that the requested S-NSSAI is subject to quota management (and/or not subject to quota management). In some embodiments, the PDU count response message 1112 may also include an indication of a percentage of available quota for the requested S-NSSAI. In some embodiments, the PDU count message 1112 may be (or included) a Nnsqm_PDUCount_AvailabilityCheck_Response message.

The AMF may then send a PDU session request message 1114 to the SMF. The PDU session request message may include an indication of the S-NSSAI and a PDU session identifier. In some embodiments, the PDU session request message 1114 may be (or include) a Nsmf_PDUSesison_CreateSMContextReqquest message. The SMF may then send a PDU session response message 1116 to the AMF indicating successful initiation of the PDU session. In some embodiments, the PDU session response message 1116 may be (or include) a Nsmf_PDUSesison_CreateSMContextResponse message.

The AMF may then send a PDU session establishment accept message 1118 to the UE. The PDU session establishment accept message 1118 may include an indication of establishment of the PDU session in the requested S-NSSAI. In some embodiments, the PDU session establishment accept message 1118 may include an indication that the requested S-NSSAI is subject to quota management (and/or not subject to quota management). In some embodiments, the PDU session establishment accept message 1118 may also include an indication of a percentage of available quota for the requested S-NSSAI. In some embodiments, the indications may be included in an S-NSSAI information element. In some embodiments, the indications may be included in a quota management field of an S-NSSAI information element. In some embodiments, the quota management field may be 8 bits. In some embodiments, the first bit (e.g., bit 1) may indicate whether the particular S-NSSAI is subject to quota management and the remaining 7 bits (e.g., bits 2 to 8) may indicate the percentage of available quota for the particular S-NSSAI.

In some embodiments, the UE may use information associated with quota management to avoid PDU session establishment rejections. In some embodiments, once a UE has established a PDU session in an S-NSSAI, the UE may base further PDU session establishment on the information. In some embodiments, when the UE initiates a new application, the UE may decide whether to route data traffic from new application via an existing PDU session or start a new PDU session by taking into account a session aggregate maximum bit rate (AMBR) value for the existing PDU session. For example, if a quota availability for the S-NSSAI is 85% and a current data rate for the existing PDU session is close to a session-AMBR, the UE may decide to initiate establishment of a new PDU session. However, if the quota availability is just 5% for the S-NSSAI, the UE may continue to reuse the existing PDU session assuming current data rate for the existing PDU session is not close to the session-AMBR instead of establishing a new PDU session.

In some embodiments, the UE may implement access control logic based on a received available quota for a particular network slice (e.g., a particular S-NSSAI). In some embodiments, the UE may generate a random number between 0-100. The UE may compare the random number to an available quota percentage as provided by the network. In some embodiments, UE may proceed with a PDU session establishment procedure for the network slice when the random number is less than the available quota percentage. Alternatively, when the random number is not less than the available quota percentage, the UE may backoff from (e.g., not proceed with) establishing a new PDU session for the network slice for a specified period of time, e.g. such as "x" minutes and/or "x" seconds. For example, when an available quota is 95% and a random number generated is 75, the UE may proceed with a PDU Session establishment for the network slice. As another example, when the available quota is 15% and a random number generated in 25, the UE may not proceed with initiating a PDU session establishment procedure for the network slice.

In some embodiments, a UE may periodically request (e.g., trigger) a registration procedure to receive an updated status regarding quota availability for S-NSSAIs. In some embodiments, a network may publish an updated status regarding quota availability to UEs that are authorized to use a network slice when an available quota decreases below a lower threshold and/or increases above an upper threshold. For example, the network may publish an updated status regarding quota availability to UEs that are authorized to use a network slice when an available quota decreases below 15% and/or when updated an available quota increases above 85%. In some embodiments, the network may piggyback (append) quota details to any ongoing network access stratus (NAS) message to a UE to reduce signaling between the network and the UE. In some embodiments, after sharing an available quota percentage during initial registration, the network may send the quota only when it is lower than a threshold, e.g., such as when quota decreases below 15%. In such embodiments, the UE may assume there is quota available in the network slice for PDU session establishment. In some embodiments, the network may periodically provide an updated quota availability to a UE, e.g., every "x" minutes and/or every "x" seconds. In some embodiments, such a time period may be configured and/or specified by a standard.

In some embodiments, a UE may avoid overloading a single PDU session when an available quota percentage for a network slice is greater than a threshold. In some embodiments, a UE may avoid PDU session establishment rejections when an available quota percentage is less than a threshold which may lead to a reduction in signaling. In some embodiments, for any new traffic related to an S-NSSAI subject to quota management, the UE may base decisions to initiate new PDU session or use the existing PDU session on received quota management information.

Figure 12:
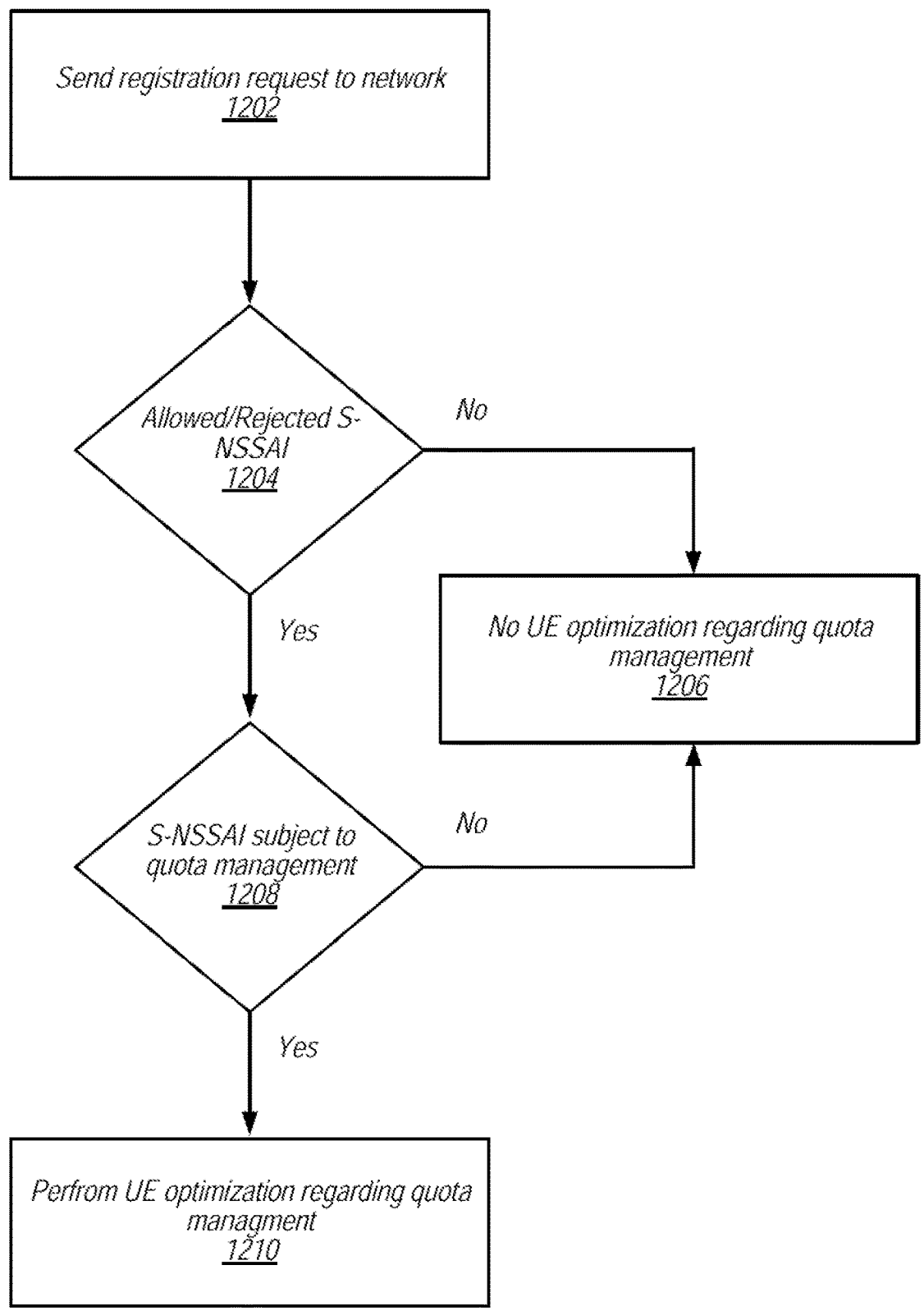
FIG. 12 illustrates a block diagram of an example of a method for a UE to determine optimization behavior based on quota management information received from a network, according to some embodiments.

FIG. 12 illustrates a block diagram of an example of a method for a UE to determine optimization behavior based on quota management information received from a network, according to some embodiments. The method shown in FIG. 12 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1202, a UE, such as UE 106, may send a registration request to a network, e.g., as described above. For example, the UE may send a registration request for identifying and/or indicating a particular S-NSSAI. In some embodiments, the registration request may include a DNN.

At 1204, the UE may receive a registration accepted message from the network. In some embodiments, the registration accepted message may include an indication of an "Allowed S-NSSAI" or a "Rejected S-NSSAI". In some embodiments, the registration accepted message may not include such an indication.

At 1206, in response to determining that the registration accepted message does not include network slice information, the UE may determine that no optimization related to quota management is necessary/required.

At 1208, in response to determining that the registration accepted message does include network slice information (e.g., an indication of an "Allowed S-NSSAI" or a "Rejected S-NSSAI"), the UE may determine, e.g., based on the contents of the registration accepted message, whether the particular S-NSSAI is subject to quota management. In some embodiments, the registration accepted message may include an indication that the particular S-NSSAI is subject to quota management (and/or not subject to quota management). In some embodiments, the registration accepted message may also include an indication of a percentage of available quota for the requested S-NSSAI. In some embodiments, the indications may be included in an S-NSSAI information element. In some embodiments, the indications may be included in a quota management field of an S-NSSAI information element. In some embodiments, the quota management field may be 8 bits. In some embodiments, the first bit (e.g., bit 1) may indicate whether the particular S-NSSAI is subject to quota management and the remaining 7 bits (e.g., bits 2 to 8) may indicate the percentage of available quota for the particular S-NSSAI.

At 1210, in response to determining that the particular S-NSSAI is subject to quota management, the UE may perform optimizations associated with quota management, e.g., as further described below in reference to FIG. 13. Alternatively, in response to determining that the particular S-NSSAI is not subject to quota management, the method may return to 1206 where the UE may determine that no optimization related to quota management is necessary/required.

Figure 13:
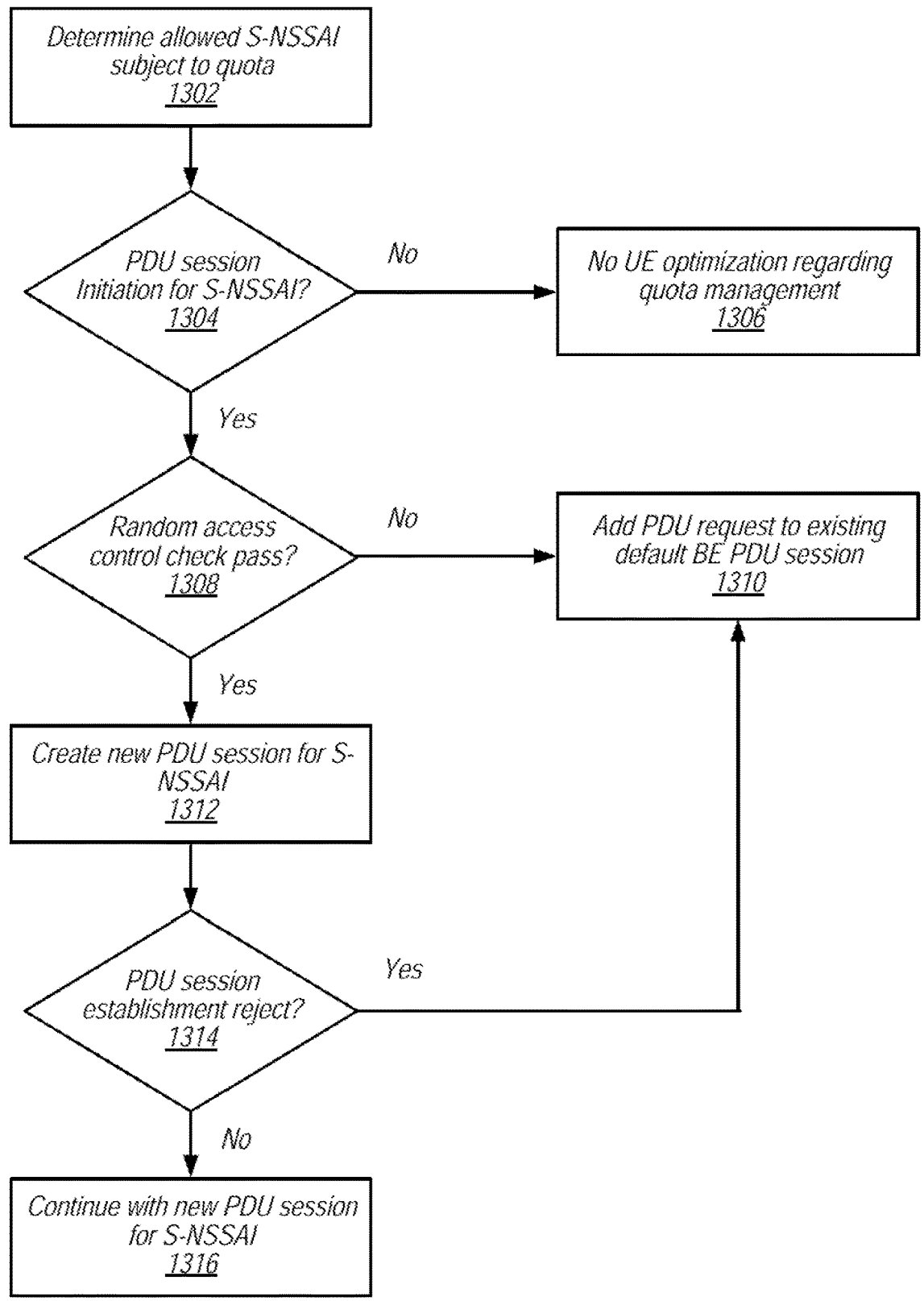
FIG. 13 illustrates a block diagram of an example of a method for a UE to optimize behavior based on quota management information received from a network, according to some embodiments.

FIG. 13 illustrates a block diagram of an example of a method for a UE to optimize behavior based on quota management information received from a network, according to some embodiments. The method shown in FIG. 13 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1302, a UE, such as UE 106, may determine that an allowed (e.g., accepted)S-NSSAI is subject to quota management, e.g., as described above in reference to FIG. 12.

At 1304, the UE may determine whether to initiate a PDU session for the allowed S-NSSAI. In other words, the UE may determine whether to initiate a new PDU session using resources associated with the S-NSSAI.

At 1306, in response to determining that the UE will not initiate a PDU session for the allowed S-NSSAI, the UE may determine that no optimization related to quota management is necessary/required.

At 1308, in response to determining that the UE will initiate a PDU session for the allowed S-NSSAI, the UE may determine whether a random access control check has been passed. In some embodiments, random access control check criteria may include a UE generated random number being less than an available quota in order for the UE to continue with initiation of the PDU session for the allowed S-NSSAI. For example, the random access control check may be passed when an available quota is 95% and the UE generated random number is less than 95. As another example, the random access control check may be failed when an available quota is 15% and the UE generated random number is not less than 15.

At 1310, in response to failing the random access control check, the UE may add the PDU request to existing default best effort PDU session requests.

At 1312, in response to passing the random access control check, the UE may initiate a new PDU session for the allowed S-NSSAI, e.g., as described above with reference to FIG. 10.

At 1314, the UE may determine whether the PDU session for the allowed S-NSSAI is rejected. In response to determining that the PDU session for the allowed S-NSSAI has been rejected, the UE may continue the method at 1310 and add the PDU request to existing default best effort PDU session requests.

At 1316, in response to determining that the PDU session for the allowed S-NSSAI has been accepted, the UE may continue with the new PDU session for the allowed S-NSSAI.

Figure 14:
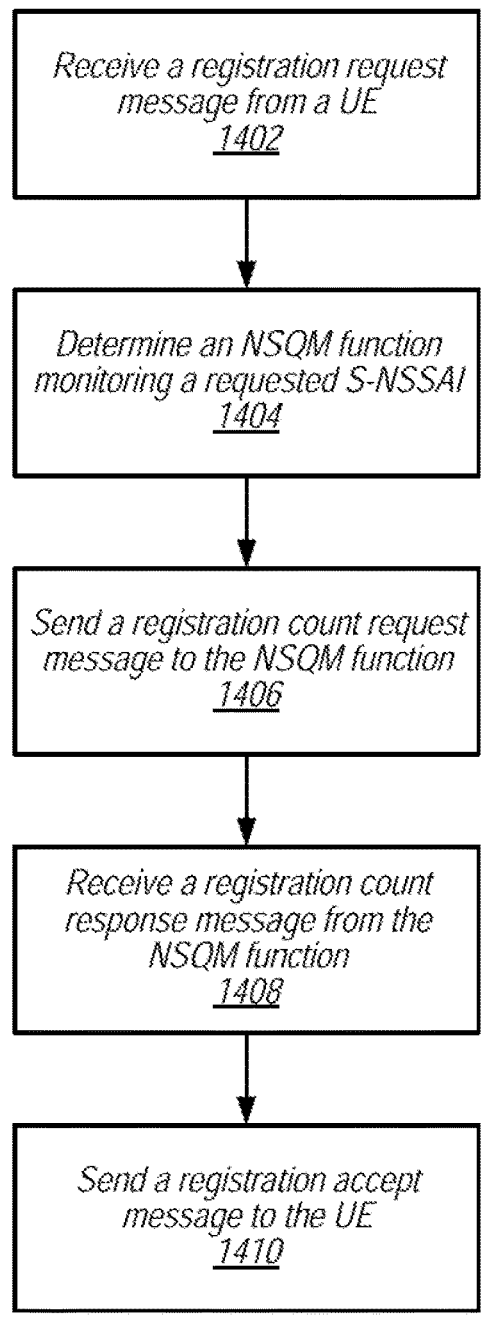
FIG. 14 illustrates a block diagram of an example of a method for registering a UE with a network slice, according to some embodiments.

FIG. 14 illustrates a block diagram of an example of a method for registering a UE with a network slice, according to some embodiments. The method shown in FIG. 4 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1402, an access and mobility management function (AMF) of a network, such as AMF 704, may receive a registration request message from a UE, such as UE 102. The registration request message may include at least an indication of a requested single network slice selection assistance information (S-NSSAI).

At 1404, the AMF may determine an NSQM function monitoring a requested S-NSSAI, e.g., such as NSQM 1060, which may also be referred to as an NSCAF. In some instances, determining the NSQM function monitoring the requested S-NSSAI may include the AMF of the network sending, to a network repository function (NRF), such as NRF 1058, a discovery request message and receiving, from the NRF, a discovery response message. The discovery request message may include the indication of the requested S-NSSAI. The discovery response message may include an address to the NSQM function monitoring the requested S-NSSAI.

At 1406, the AMF may send a registration count request message to the NSQM function. The registration count request message may include at least the indication of the S-NSSAI.

At 1408, the AMF may receive a registration count response message from the NSQM function. The registration count response message may include at least an indication that the S-NSSAI is subject to quota management. Additionally, the registration count response message may include an indication of a percentage of available quota for the requested S-NSSAI At 1410, the AMF may send a registration accept message to the UE. The registration accept message may include at least the indication that the S-NSSAI is subject to quota management. The indication that the S-NSSAI is subject to quota management may be included in a field of an S-NSSAI information element. In some instances, a first bit of an 8-bit field included in the S-NSSAI information element may indicate that the S-NSSAI is subject to quota management and remaining bits of the 8-bit field may indicate the percentage of available quota for the requested S-NSSAI. Additionally, the registration accept message may include the indication of a percentage of available quota for the requested S-NSSAI. In some instances, the indication of the percentage of available quota for the requested S-NSSAI may be included in a field of the S-NSSAI information element.

In some instances, the AMF may receive, from the UE, a protocol data unit (PDU) session request, determine an NSQM function monitoring the requested S-NSSAI, send, to the NSQM function, a PDU count request message, receive from the NSQM function, a PDU count response message, establish, with a session management function (SMF) of the network, a PDU session, and send, to the UE, a PDU session establishment accept message. The PDU session request may include at least an indication of a requested S-NSSAI. The PDU count request message may include at least the indication of the S-NSSAI. The PDU count response message may include at least an indication that the S-NSSAI is subject to quota management. The PDU session establishment accept message may include at least the indication that the S-NSSAI is subject to quota management. In some instances, determining the NSQM function monitoring the requested S-NSSAI may include the AMF of the network, sending, to a network repository function (NRF), a discovery request message and receiving, from the NRF, a discovery response message. The discovery request message may include the indication of the requested S-NSSAI. The discovery response message may include an address to the NSQM function monitoring the requested S-NSSAI. In some instances, the indication that the S-NSSAI is subject to quota management may be included in a field of an S-NSSAI information element. In some instances, the PDU count response message may include an indication of a percentage of available quota for the requested S-NSSAI. Additionally, the PDU accept message may include the indication of a percentage of available quota for the requested S-NSSAI. Further, the indication of the percentage of available quota for the requested S-NSSAI may be included in a field of an S-NSSAI information element. In addition, a first bit of an 8-bit field included in the S-NSSAI information element indicates that the S-NSSAI is subject to quota management and remaining bits of the 8-bit field indicate the percentage of available quota for the requested S-NSSAI.

In some instances, the AMF may receive, from the UE, a registration request and may send, to the UE, a registration response. The registration request may include an indication of one or more S-NSSAIs. The registration response may include quota availability for the one or more S-NSSAIs.

In some instances, the AMF may periodically query the NSQM function for updated quota availability of the requested S-NSSAI and, in response to determining that the updated quota availability of the requested S-NSSAI decreases below a first threshold, publish, to at least the UE, the updated quota availability of the requested S-NSSAI. Further, the AMF may, in response to determining that the updated quota availability of the requested S-NSSAI exceeds a second threshold, publish, to at least the UE, the updated quota availability of the requested S-NSSAI. In some instances, the AMF may periodically query the NSQM function for updated quota availability of the requested S-NSSAI and publish, to at least the UE, the updated quota availability of the requested S-NSSAI. In some instances, publishing the updated quota availability of the requested S-NSSAI may include the AMF appending the updated quota availability of the requested S-NSSAI to a network access stratum (NAS) message intended for the UE.

Figure 15:
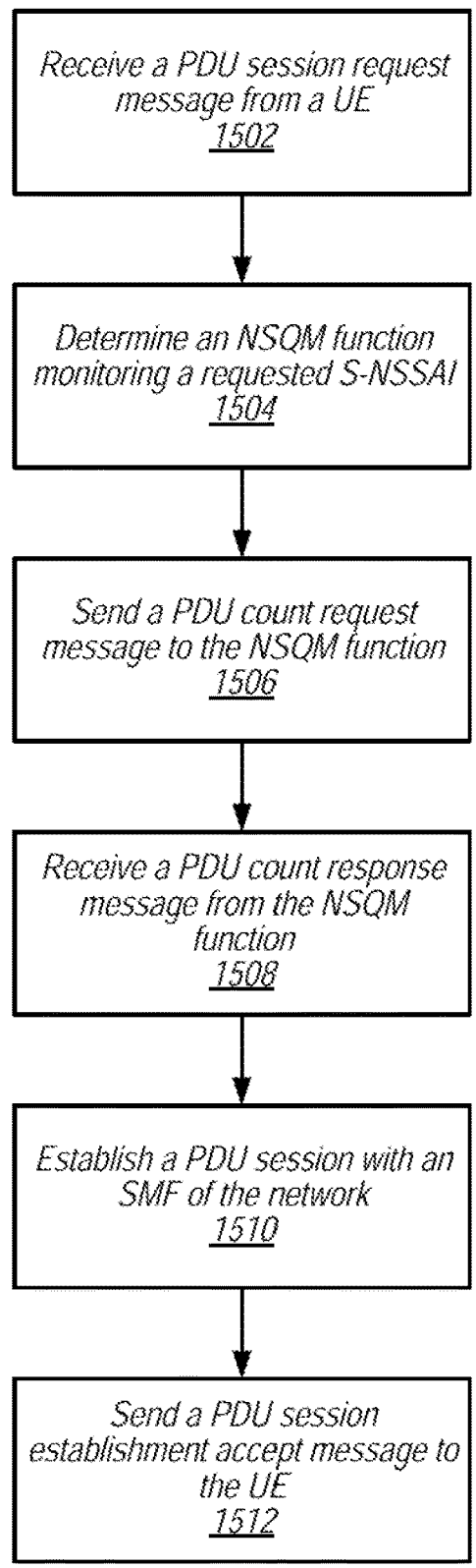
FIG. 15 illustrates a block diagram of an example of a method for initiating a PDU session on a network slice, according to some embodiments.

FIG. 15 illustrates a block diagram of an example of a method for initiating a PDU session on a network slice, according to some embodiments. The method shown in FIG. 15 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1502, an access and mobility management function (AMF) of a network, such as AMF 704, may receive a protocol data unit (PDU) session request message from a UE, such as UE 106. The PDU session request message may include at least an indication of a requested single network slice selection assistance information (S-NSSAI).

At 1504, the AMF may determine an NSQM function, which may also be referred to as an NSCAF, monitoring a requested S-NSSAI. In some instances, determining the NSQM function monitoring the requested S-NSSAI may include the AMF of the network sending, to a network repository function (NRF), such as NRF 1058, a discovery request message and receiving, from the NRF, a discovery response message. The discovery request message may include the indication of the requested S-NSSAI. The discovery response message may include an address to the NSQM function monitoring the requested S-NSSAI.

At 1506, the AMF may send a PDU count request message to the NSQM function. The PDU count request message may include at least the indication of the S-NSSAI.

At 1508, the AMF may receive a PDU count response message from the NSQM function. The PDU count response message may include at least an indication that the S-NSSAI is subject to quota management. In some instances, the indication that the S-NSSAI is subject to quota management may be included in a field of an S-NSSAI information element. In some instances, the PDU count response message may include an indication of a percentage of available quota for the requested S-NSSAI. The indication of the percentage of available quota for the requested S-NSSAI may be included in a field of an S-NSSAI information element. In some instances, a first bit of an 8-bit field included in the S-NSSAI information element any indicate that the S-NSSAI is subject to quota management and remaining bits of the 8-bit field may indicate the percentage of available quota for the requested S-NSSAI.

At 1510, the AMF may establish, with a session management function (SMF) of the network, a PUD session.

At 1512, the AMF may send a PDU session establishment accept message to the UE. The PDU session establishment accept message includes at least the indication that the S-NSSAI is subject to quota management. In some instances, the indication that the S-NSSAI is subject to quota management may be included in a field of an S-NSSAI information element. In some instances, the PDU session establishment accept message may include the indication of a percentage of available quota for the requested S-NSSAI. The indication of the percentage of available quota for the requested S-NSSAI may be included in a field of an S-NSSAI information element. In some instances, a first bit of an 8-bit field included in the S-NSSAI information element any indicate that the S-NSSAI is subject to quota management and remaining bits of the 8-bit field may indicate the percentage of available quota for the requested S-NSSAI.

In some instances, the AMF may receive, from the UE, a registration request message, determine a NSQM function monitoring the requested S-NSSAI, send, to the NSQM function, a registration count request message, receive, from the NSQM function, a registration count response message, and send, to the UE, a registration accept message. The registration request message may include at least an indication of a S-NSSAI. The registration count request message may include at least the indication of the S-NSSAI. The registration count response message may include at least an indication that the S-NSSAI is subject to quota management. The registration accept message may include at least the indication that the S-NSSAI is subject to quota management. In some instances, determining the NSQM function monitoring the requested S-NSSAI may include the AMF of the network, sending, to an NRF, a discovery request message and receiving, from the NRF, a discovery response message. The discovery request message may include the indication of the requested S-NSSAI. The discovery response message may include an address to the NSQM function monitoring the requested S-NSSAI. In some instances, the indication that the S-NSSAI is subject to quota management may be included in a field of an S-NSSAI information element. In some instances, the registration count response message may include an indication of a percentage of available quota for the requested S-NSSAI. The registration accept message may also include the indication of a percentage of available quota for the requested S-NSSAI. The indication of the percentage of available quota for the requested S-NSSAI may be included in a field of an S-NSSAI information element. In some instances, a first bit of an 8-bit field included in the S-NSSAI information element may indicate that the S-NSSAI is subject to quota management and remaining bits of the 8-bit field may indicate the percentage of available quota for the requested S-NSSAI.

In some instances, the AMF may receive, from the UE, a registration request and may send, to the UE, a registration response. The registration request may include an indication of one or more S-NSSAIs. The registration response may include quota availability for the one or more S-NSSAIs.

In some instances, the AMF may periodically query the NSQM function for updated quota availability of the requested S-NSSAI and, in response to determining that the updated quota availability of the requested S-NSSAI decreases below a first threshold, publish, to at least the UE, the updated quota availability of the requested S-NSSAI. In some instances, in response to determining that the updated quota availability of the requested S-NSSAI exceeds a second threshold, the AMF may publish, to at least the UE, the updated quota availability of the requested S-NSSAI.

In some instances, the AMF may periodically query the NSQM function, which may also be referred to as an NSCAF, for updated quota availability of the requested S-NSSAI and publish, to at least the UE, the updated quota availability of the requested S-NSSAI. In some instances, publishing the updated quota availability of the requested S-NSSAI may include the AMF of the network appending the updated quota availability of the requested S-NSSAI to a network access stratum (NAS) message intended for the UE.

Figure 16:
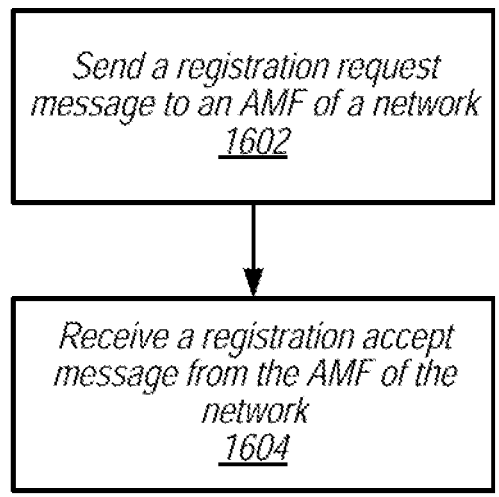
FIG. 16 illustrates a block diagram of an example of another method for registering a UE with a network slice, according to some embodiments.

FIG. 16 illustrates a block diagram of an example of another method for registering a UE with a network slice, according to some embodiments. The method shown in FIG. 16 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1602, a UE, such as UE 106, may send a registration request message to an AMF of a network, such as AMF 704. The registration request message may include at least an indication of a requested single network slice selection assistance information (S-NSSAI).

At 1604, the UE may receive, from the AFM of the network, a registration accept message. The registration accept message may include at least the indication that the S-NSSAI is subject to quota management. The indication that the S-NSSAI is subject to quota management may be included in a field of an S-NSSAI information element. The registration accept message may also include an indication of a percentage of available quota for the requested S-NSSAI. The indication of the percentage of available quota for the requested S-NSSAI may be included in a field of an S-NSSAI information element. In some instances, a first bit of an 8-bit field included in the S-NSSAI information element may indicate that the S-NSSAI is subject to quota management and remaining bits of the 8-bit field may indicate the percentage of available quota for the requested S-NSSAI.

In some instances, the UE may send, to the AMF of the network, a protocol data unit (PDU) session request and may receive, from the AMF of the network, a PDU session establishment accept message. The PDU session request may include at least an indication of a requested S-NSSAI. The PDU session establishment accept message may include at least the indication that the S-NSSAI is subject to quota management. The indication that the S-NSSAI is subject to quota management may be included in a field of an S-NSSAI information element. The PDU accept message may also include the indication of a percentage of available quota for the requested S-NSSAI. The indication of the percentage of available quota for the requested S-NSSAI may be included in a field of an S-NSSAI information element. In some instances, a first bit of an 8-bit field included in the S-NSSAI information element may indicate that the S-NSSAI is subject to quota management and remaining bits of the 8-bit field may indicate the percentage of available quota for the requested S-NSSAI.

In some instances, the UE may send, to the AMF of the network, a registration request and receive, from the AMF of the network, a registration response. The registration request may include an indication of one or more S-NSSAIs. The registration response may include quota availability for the one or more S-NSSAIs.

In some instances, the UE may receive, from the AMF of the network, an updated quota availability of the requested S-NSSAI, e.g., when the updated quota availability of the requested S-NSSAI decreases below a threshold and/or when the updated quota availability of the requested S-NSSAI increases above a threshold.

In some instances, the UE may periodically receive, from the AMF of the network, an updated quota availability of the requested S-NSSAI. The updated quota availability of the requested S-NSSAI may be appended to a network access stratum (NAS) message intended for the UE.

Figure 17:
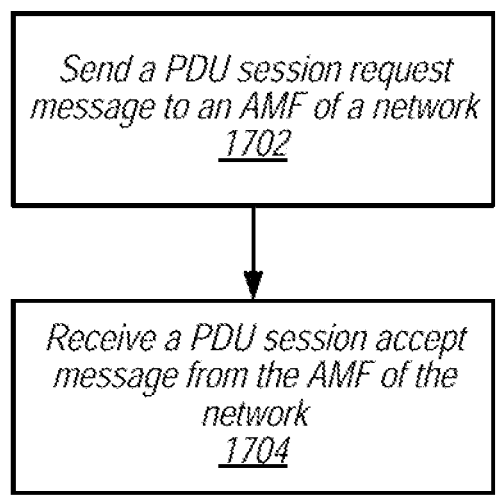
FIG. 17 illustrates a block diagram of an example of another method for initiating a PDU session on a network slice, according to some embodiments.

FIG. 17 illustrates a block diagram of an example of another method for initiating a PDU session on a network slice, according to some embodiments. The method shown in FIG. 17 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1702, a UE, such as UE 106, may send a PDU session request message to an AMF of a network, such as AMF 704. The PDU session request message may include at least an indication of a requested single network slice selection assistance information (S-NSSAI).

At 1704, the UE may receive, from the AFM of the network, a PDU session accept message. The PDU session accept message may include at least the indication that the S-NSSAI is subject to quota management. The indication that the S-NSSAI is subject to quota management may be included in a field of an S-NSSAI information element. In some instances, the PDU session accept message may also include an indication of a percentage of available quota for the requested S-NSSAI. The indication of percentage of available quota for the requested S-NSSAI may be included in a field of an S-NSSAI information element. In some instances, a first bit of an 8-bit field included in the S-NSSAI information element may indicate that the S-NSSAI is subject to quota management and remaining bits of the 8-bit field may indicate the percentage of available quota for the requested S-NSSAI.

In some instances, the UE may send, to the AMF of the network, a registration request and may receive, from the AMF of the network, a registration accept message. The registration request may include at least an indication of a requested S-NSSAI. The registration accept message may include at least the indication that the S-NSSAI is subject to quota management. In some instances, the indication that the S-NSSAI is subject to quota management may be included in a field of an S-NSSAI information element. The registration accept message may also include the indication of a percentage of available quota for the requested S-NSSAI. The indication of the percentage of available quota for the requested S-NSSAI may be included in a field of an S-NSSAI information element. In some instances, a first bit of an 8-bit field included in the S-NSSAI information element may indicate that the S-NSSAI is subject to quota management and remaining bits of the 8-bit field may indicate the percentage of available quota for the requested S-NSSAI.

In some instances, the UE may send, to the AMF of the network, a registration request and may receive, from the AMF of the network, a registration response. The registration request may include an indication of one or more S-NSSAIs. The registration response may include quota availability for the one or more S-NSSAIs.

In some instances, the UE may receive, from the AMF of the network, an updated quota availability of the requested S-NSSAI, e.g., when the updated quota availability of the requested S-NSSAI decreases below a threshold and/or when the updated quota availability of the requested S-NSSAI increases above a threshold.

In some instances, the UE may periodically receive, from the AMF of the network, an updated quota availability of the requested S-NSSAI. The updated quota availability of the requested S-NSSAI may be appended to a network access stratum (NAS) message intended for the UE.

Figure 18:
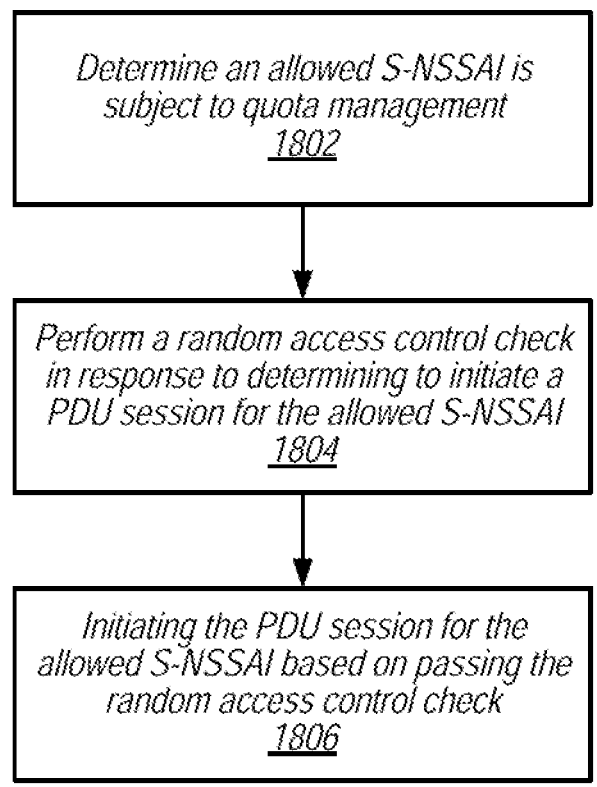
FIG. 18 illustrates a block diagram of an example of a method for behavior optimization of a UE based on quota management information received from a network, according to some embodiments.

FIG. 18 illustrates a block diagram of an example of a method for behavior optimization of a UE based on quota management information received from a network, according to some embodiments. The method shown in FIG. 18 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1802, a UE, such as UE 106, may determine an allowed single network slice selection assistance information (S-NSSAI) is subject to quota management.

At 1804, the UE may perform a random access control check, e.g., in response to determining to initiate a PDU session for the allowed S-NSSAI. In some instances, performing the random access control check based on the available quota associated with the S-NSSAI may include the UE generating a random number between 0 and 100 and comparing the random number to the available quota associated with the S-NSSAI. In some instances, when the random number is less than the available quota, the random access control check may be passed.

At 1806, the UE may initiate the PDU session for the allowed S-NSSAI, e.g., based on passing the random access control check.

In some instances, in response to failing the random access control check based on the available quota associated with the S-NSSAI, the UE may wait a period of time before attempting to initiate a new PDU session for the allowed S-NSSAI. In some instances, in response to failing the random access control check based on the available quota associated with the S-NSSAI, the UE may add the PDU session to existing best effort PDU session requests.

In some instances, the UE may send, to the AMF of the network, a registration request and may receive, from the AMF of the network, a registration accept message. The registration request may include at least an indication of a requested S-NSSAI. The registration accept message may include at least the indication that the S-NSSAI is subject to quota management. The indication that the S-NSSAI is subject to quota management may be included in a field of an S-NSSAI information element. The registration accept message may also include the indication of a percentage of available quota for the requested S-NSSAI. In some instances, the indication of the percentage of available quota for the requested S-NSSAI may be included in a field of an S-NSSAI information element. In some instances, a first bit of an 8-bit field included in the S-NSSAI information element may indicate that the S-NSSAI is subject to quota management and remaining bits of the 8-bit field may indicate the percentage of available quota for the requested S-NSSAI.

In some instances, the UE may send, to the AMF of the network, a registration request and may receive, from the AMF of the network, a registration response. The registration request may include an indication of one or more S-NSSAIs. The registration response may include quota availability for the one or more S-NSSAIs.

In some instances, the UE may receive, from the AMF of the network, an updated quota availability of the requested S-NSSAI, e.g., when the updated quota availability of the requested S-NSSAI decreases below a threshold and/or when the updated quota availability of the requested S-NSSAI increases above a threshold.

In some instances, the UE may periodically receive, from the AMF of the network, an updated quota availability of the requested S-NSSAI. The updated quota availability of the requested S-NSSAI may be appended to a network access stratum (NAS) message intended for the UE.

In some instances, the UE may send, to the AMF of the network, a protocol data unit (PDU) session request and may receive, from the AMF of the network, a PDU session establishment accept message. The PDU session request may include at least an indication of a requested S-NSSAI. The PDU session establishment accept message may include at least the indication that the S-NSSAI is subject to quota management. The indication that the S-NSSAI is subject to quota management may be included in a field of an S-NSSAI information element. The PDU accept message may also include the indication of a percentage of available quota for the requested S-NSSAI. The indication of the percentage of available quota for the requested S-NSSAI may be included in a field of an S-NSSAI information element. In some instances, a first bit of an 8-bit field included in the S-NSSAI information element may indicate that the S-NSSAI is subject to quota management and remaining bits of the 8-bit field may indicate the percentage of available quota for the requested S-NSSAI.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for registering a user equipment device (UE) with a network slice, comprising:
    an access and mobility management function (AMF) of a network,
        receiving, from a UE, a registration request message, wherein the registration request message includes at least an indication of a requested single network slice selection assistance information (S-NSSAI);
        determining a network slice quota management (NSQM) function monitoring the requested S-NSSAI;
        sending, to the NSQM function, a registration count request message, wherein the registration count request message includes at least the indication of the S-NSSAI and an indication of a percentage of available quota for the requested S-NSSAI;
        receiving, from the NSQM function, a registration count response message, wherein the registration count response message includes at least an indication that the S-NSSAI is subject to quota management; and
        sending, to the UE, a registration accept message, wherein the registration accept message includes at least the indication that the S-NSSAI is subject to quota management.

2. The method of claim 1,
    wherein determining the NSQM function monitoring the requested S-NSSAI includes the AMF of the network,
        sending, to a network repository function (NRF), a discovery request message, wherein the discovery request message includes the indication of the requested S-NSSAI; and
        receiving, from the NRF, a discovery response message, wherein the discovery response message includes an address to the NSQM function monitoring the requested S-NSSAI.

3. The method of claim 1, wherein the indication that the S-NSSAI is subject to quota management is included in a field of an S-NSSAI information element.

4. The method of claim 3, wherein a first bit of an 8-bit field included in the S-NSSAI information element indicates that the S-NSSAI is subject to quota management, and wherein remaining bits of the 8-bit field indicate a percentage of available quota for the requested S-NSSAI.

5. The method of claim 1, wherein the registration accept message further includes the indication of a percentage of available quota for the requested S-NSSAI.

6. The method of claim 1, wherein the indication of the percentage of available quota for the requested S-NSSAI is included in a field of an S-NSSAI information element.

7. An apparatus, comprising:
a memory; and
a processing element in communication with the memory, wherein the processing element is configured:
receive, from a user equipment device (UE), a protocol data unit (PDU) session request message, wherein the PDU session request message includes at least an indication of a requested single network slice selection assistance information (S-NSSAI);
determine a network slice quota management (NSQM) function monitoring the requested S-NSSAI;
send, to the NSQM function, a PDU count request message, wherein the PDU count request message includes at least the indication of the S-NSSAI and an indication of a percentage of available quota for the requested S-NSSAI;
receive, from the NSQM function, a PDU count response message, wherein the PDU count response message includes at least an indication that the S-NSSAI is subject to quota management;
establish, with a session management function (SMF) of the network, a PDU session; and
send, to the UE, a PDU session establishment accept message, wherein the PDU session establishment accept message includes at least the indication that the S-NSSAI is subject to quota management.

8. The apparatus of claim 7, wherein, to determine the NSQM function monitoring the requested S-NSSAI, the processing element is further configured to:
send, to a network repository function (NRF), a discovery request message, wherein the discovery request message includes the indication of the requested S-NSSAI; and
receive, from the NRF, a discovery response message, wherein the discovery response message includes an address to the NSQM function monitoring the requested S-NSSAI.

9. The apparatus of claim 7, wherein the indication that the S-NSSAI is subject to quota management is included in a field of an S-NSSAI information element.

10. The apparatus of claim 9, wherein a first bit of an 8-bit field included in the S-NSSAI information element indicates that the S-NSSAI is subject to quota management, and wherein remaining bits of the 8-bit field indicate a percentage of available quota for the requested S-NSSAI.

11. The apparatus of claim 7, wherein the PDU session establishment accept message further includes the indication of a percentage of available quota for the requested S-NSSAI.

12. The apparatus of claim 7, wherein the indication of the percentage of available quota for the requested S-NSSAI is included in a field of an S-NSSAI information element, and wherein a first bit of an 8-bit field included in the S-NSSAI information element indicates that the S-NSSAI is subject to quota management, and wherein remaining bits of the 8-bit field indicate the percentage of available quota for the requested S-NSSAI.

13. The apparatus of claim 7, wherein the processing element is further configured to:
receive, from the UE, a registration request, wherein the registration request includes an indication of one or more S-NSSAIs; and
send, to the UE, a registration response, wherein the registration response includes quota availability for the one or more S-NSSAIs.

14. The apparatus of claim 7, wherein the processing element is further configured to:
periodically query the NSQM function for updated quota availability of the requested S-NSSAI;
in response to determining that the updated quota availability of the requested S-NSSAI decreases below a first threshold, publish, to at least the UE, the updated quota availability of the requested S-NSSAI; and
in response to determining that the updated quota availability of the requested S-NSSAI exceeds a second threshold, publish, to at least the UE, the updated quota availability of the requested S-NSSAI.

15. The apparatus of claim 14, wherein, to publish the updated quota availability of the requested S-NSSAI, the processing element is further configured to append the updated quota availability of the requested S-NSSAI to a network access stratum (NAS) message intended for the UE.

16. A non-transitory computer readable memory medium storing program instructions executable by processing circuitry of an access and mobility management function (AMF) of a network to cause the AMF to:
receive, from a UE, a registration request message, wherein the registration request message includes at least an indication of a requested single network slice selection assistance information (S-NSSAI);
determine a network slice access control function (NSCAF) monitoring the requested S-NSSAI;
send, to the NSCAF, a registration count request message, wherein the registration count request message includes at least the indication of the S-NSSAI and an indication of a percentage of available quota for the requested S-NSSAI;
receive, from the NSCAF, a registration count response message, wherein the registration count response message includes at least an indication that the S-NSSAI is subject to quota management; and
send, to the UE, a registration accept message, wherein the registration accept message includes at least the indication that the S-NSSAI is subject to quota management.

17. The non-transitory computer readable memory medium of claim 16,
wherein, to determine the NSCAF monitoring the requested S-NSSAI includes the AMF of the network, the program instructions are further executable to cause the AMF to:
send, to a network repository function (NRF), a discovery request message, wherein the discovery request message includes the indication of the requested S-NSSAI; and
receive, from the NRF, a discovery response message, wherein the discovery response message includes an address to the NSCAF monitoring the requested S-NSSAI.

18. The non-transitory computer readable memory medium of claim 16,
wherein the indication that the S-NSSAI is subject to quota management is included in a field of an S-NSSAI information element; wherein a first bit of an 8-bit field included in the S-NSSAI information element indicates that the S-NSSAI is subject to quota management, and wherein remaining bits of the 8-bit field indicate a percentage of available quota for the requested S-NSSAI.

19. The non-transitory computer readable memory medium of claim 16,
wherein the registration accept message further includes the indication of a percentage of available quota for the requested S-NSSAI.

20. The non-transitory computer readable memory medium of claim 19,
wherein the indication of the percentage of available quota for the requested S-NSSAI is included in a field of an S-NSSAI information element.

* * * * *